US006920405B2

(12) United States Patent
Lawrence

(10) Patent No.: US 6,920,405 B2
(45) Date of Patent: Jul. 19, 2005

(54) SYSTEMS, METHODS AND COMPUTER PROGRAM PRODUCTS FOR CONSTRUCTING SAMPLING PLANS FOR ITEMS THAT ARE MANUFACTURED

(75) Inventor: David E. Lawrence, Florida, NY (US)

(73) Assignee: Becton, Dickinson and Company, Franklin Lakes, NJ (US)

( * ) Notice: Subject to any disclaimer, the term of this patent is extended or adjusted under 35 U.S.C. 154(b) by 0 days.

(21) Appl. No.: 10/616,261

(22) Filed: Jul. 8, 2003

(65) Prior Publication Data

US 2004/0107062 A1 Jun. 3, 2004

Related U.S. Application Data

(62) Division of application No. 09/397,357, filed on Sep. 15, 1999, now Pat. No. 6,636,818.

(51) Int. Cl.$^7$ .............................................. G05B 15/00
(52) U.S. Cl. .......................................... 702/83; 702/82
(58) Field of Search ................................ 700/108–110; 702/81–84

(56) References Cited

U.S. PATENT DOCUMENTS

| | | | |
|---|---|---|---|
| 5,301,118 A | | 4/1994 | Heck et al. |
| 5,440,478 A | * | 8/1995 | Fisher et al. ................ 700/109 |
| 5,465,221 A | | 11/1995 | Merat et al. |
| 5,717,607 A | | 2/1998 | Hu |
| 5,719,796 A | | 2/1998 | Chen |
| 5,847,259 A | | 12/1998 | Hu |
| 5,864,483 A | * | 1/1999 | Brichta ....................... 700/109 |
| 5,937,364 A | * | 8/1999 | Westgard et al. ............. 702/83 |
| 6,408,219 B2 | * | 6/2002 | Lamey et al. ................ 700/110 |
| 6,636,818 B1 | * | 10/2003 | Lawrence ..................... 702/83 |

OTHER PUBLICATIONS

American National Standard, Sampling Procedures and Tables for Inspection by Variables for Percent Nonconforming, Published by ASQC, Milwaukee, WI, Copyright 1993.

* cited by examiner

*Primary Examiner*—Patrick Assouad
*Assistant Examiner*—Craig Steven Miller
(74) *Attorney, Agent, or Firm*—David W. Highet

(57) ABSTRACT

A desired Acceptable Quality Limit (AQL), a desired Key Defect Rate (KDR), a desired power of a sampling plan for items that are manufactured and a desired false alarm rate for the sampling plan are input into a computer. The computer calculates a required sample size to provide the desired AQL, the desired KDR, the desired power of the sampling plan for the items that are manufactured and the desired false alarm rate for the sampling plan. Thus, each of the individual parameters may be independently specified based on the items that are manufactured, desired AQLs, KDRs, power and false alarm rates. Reliance on ANSI/ASQ Z1.9 tables which might best fit a user's desired parameters can be reduced and preferably eliminated. In addition to calculating the required sample size, a decision rule critical value also may be calculated based upon the required sample size to provide the desired AQL, the desired KDR, the desired power and the desired false alarm rate for the sampling plan. Following the calculations, a relationship between sample size, acceptable number of defective items and false alarm rate automatically may be graphically displayed based upon the desired AQL, the desired KDR and the desired power of the sampling plan. The items that are manufactured may then be sampled at the required sample size to obtain samples, and the number of defective items in the samples or other response variables in each of the samples, may be measured. After measuring the response variables, such as the number of defective items, the measured response variable for each of the samples is input into the computer and an estimate of the Quality Level (QL) for the items that are manufactured is calculated, based on the measured response variable for each of the samples.

23 Claims, 27 Drawing Sheets

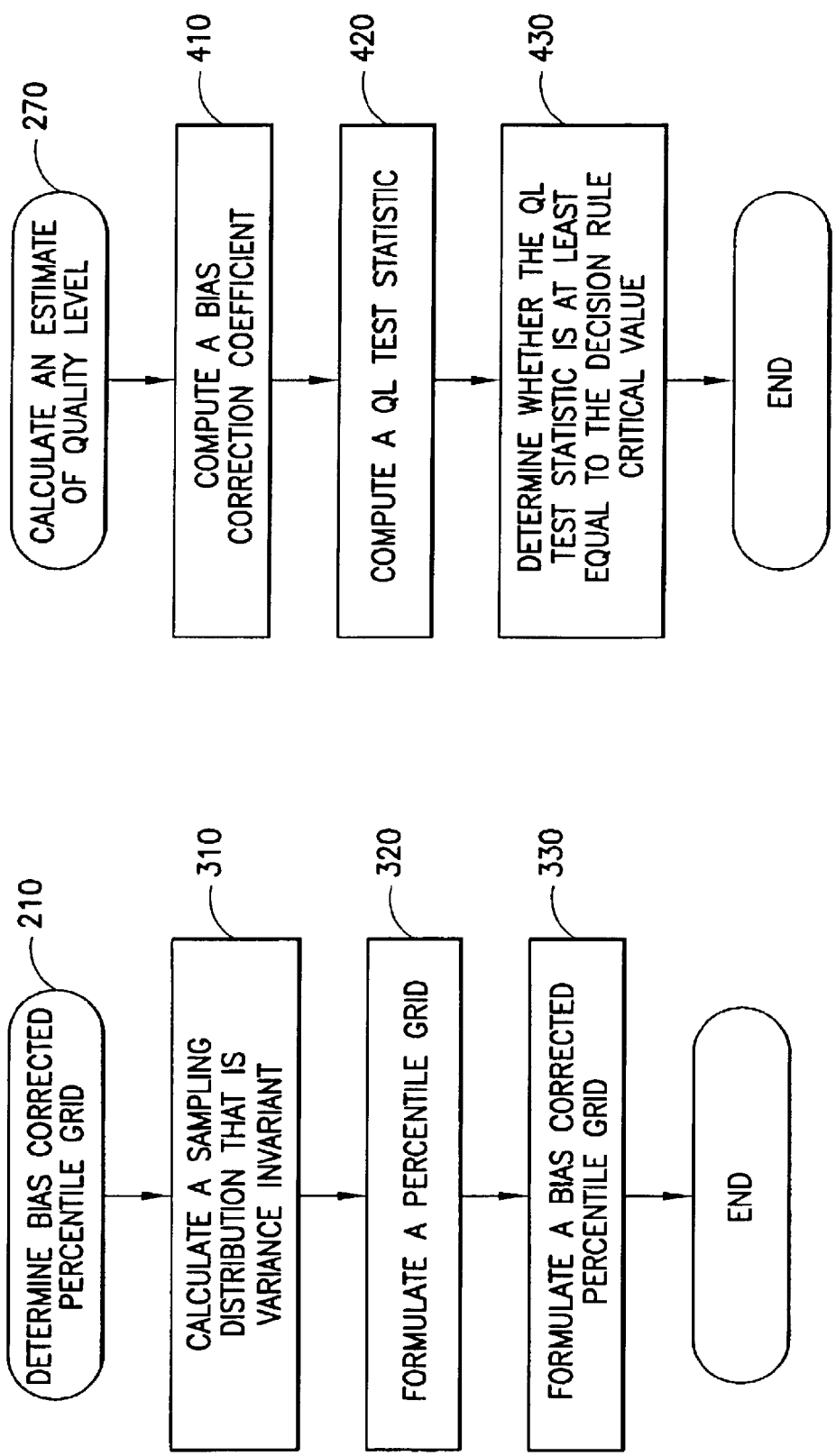

SYSTEMS, METHODS AND COMPUTER PROGRAM PRODUCTS FOR CONSTRUCTING SAMPLING PLANS FOR ITEMS THAT ARE MANUFACTURED

RELATED APPLICATIONS

This application is a divisional of application Ser No. 09/397,357 filed on Sep. 15, 1999 U.S. Pat. No. 6,636,818.

FIELD OF THE INVENTION

This invention relates to data processing systems, methods and computer program products, and more particularly to statistical systems, methods and computer program products.

BACKGROUND OF THE INVENTION

Sampling plans are widely used in manufacturing environments in order to determine whether items are being manufactured at a desired quality level. In order to construct a sampling plan, the ANSI/ASQ Z1.9 standard generally is used. The ANSI/ASQ Z1.9 standard is a collection of sampling plans presented in tabular and graphical form. In order to construct a sampling plan, the ANSI/ASQ Z1.9 standard is studied, and a sampling plan which best matches a desired sampling plan is selected.

Unfortunately, in using the ANSI/ASQ Z1.9 standard, the user may be bound to those sampling plans that are set forth in the standard. In particular, specific values of error rates, power, sample size and other parameters may be forced upon a user because the tables may not include the exact criteria that are desired by a given user.

Moreover, because the ANSI/ASQ Z1.9 standard uses test procedures that are based on a non-central t distribution, it may be difficult for the user to interpolate or extrapolate between tables of the standard. Notwithstanding these difficulties, the ANSI/ASQ Z1.9 standard continues to be widely used in constructing sampling plans for items that are manufactured.

SUMMARY OF THE INVENTION

It is therefore an object of the present invention to provide improved systems, methods and computer program products for constructing sampling plans for items that are manufactured.

It is another object of the present invention to provide systems, methods and computer program products for constructing sampling plans that can be flexible to meet the needs of a particular user and manufacturing process.

These and other objects are provided, according to the present invention, by inputting into a computer a desired Acceptable Quality Limit (AQL), a desired Key Defect Rate (KDR), a desired power of a sampling plan for the items that are manufactured and a desired false alarm rate for the sampling plan. The computer then calculates a required sample size to provide the desired AQL, the desired KDR, the desired power of the sampling plan for the items that are manufactured and the desired false alarm rate for the sampling plan. Thus, each of the individual parameters may be independently specified based on the items that are manufactured, desired AQLs, KDRs, power and false alarm rates. Reliance on ANSI/ASQ Z1.9 tables which might best fit a user's desired parameters can be reduced and preferably eliminated.

In addition to calculating the required sample size, a decision rule critical value also may be calculated based upon the required sample size to provide the desired AQL, the desired KDR, the desired power and the desired false alarm rate for the sampling plan. Following the calculations, a relationship between sample size, acceptable number of defective items and false alarm rate automatically may be graphically displayed based upon the desired AQL, the desired KDR and the desired power of the sampling plan.

The items that are manufactured may then be sampled at the required sample size to obtain samples, and the number of defective items in the samples or other response variables in each of the samples, may be measured. After measuring the response variables, such as the number of defective items, the measured response variable for each of the samples is input into the computer and an estimate of the Quality Level (QL) for the items that are manufactured is calculated, based on the measured response variable for each of the samples.

Prior to calculating the required sample size and the decision rule critical value, a sample distribution that is variance invariant may be calculated based on a normal distribution. A percentile grid of sample size and a true process defect rate is formulated based on estimated percentiles of a cumulative distribution of the sampling distribution. A bias-corrected percentile grid of sample size and the true process defect rate is then formulated from the percentile grid. The bias-corrected percentile grid is stored in the computer.

The bias-corrected percentile grid may be used to compute the decision rule critical value from the AQL and the false alarm rate, across a plurality of sample sizes. The bias-corrected percentile grid is evaluated for the decision rule critical value, to determine the required sample size. More particularly, the decision rule critical value is computed from the AQL, the false alarm rate and the desired sample size using the bias-corrected percentile grid of sample size and a true process defect rate. The bias-corrected percentile grid is evaluated for values that are larger than the AQL, with the percentile being the desired power.

After the measured response variable for each of the samples is input into the computer, an estimate of the QL may be calculated by computing a bias correction coefficient. A QL test statistic is computed as a function of the bias correction coefficient and at least one quantile from a cumulative distribution function of a central t distribution, with at least one argument that is a function of a sample mean, a sample standard deviation, the sample size and a specification limit. The computer automatically can determine whether the QL test statistic is at least equal to the decision rule critical value.

In another aspect of the invention, after the measured response variables are input to the computer, the computer calculates a point estimate of the number of out-of-specification items that are manufactured based on the measured response variable for each of the samples.

In addition to calculating a required sample size as was described above, the present invention also may be used to calculate a KDR that is produced from a desired sample size. In particular, a desired sample size, a desired false alarm rate, a desired AQL and a desired power are input into a computer. The computer calculates a KDR that is produced from the desired sample size, the desired false alarm rate, the desired AQL and the desired power of the sampling plan for the items that are manufactured. Thus, given a desired sample rate, a KDR may be calculated.

The KDR may be calculated by computing a decision rule critical value based on the desired AQL and the desired false alarm rate for the desired sample size. After the KDR is calculated, a relationship between acceptable number of defective items and false alarm rate may be graphically displayed based on the desired AQL, the desired KDR and the desired power of the sampling plan.

As described above, after the calculation is made, the items may be sampled at the desired sample size to obtain samples, and a KDR of the items that are manufactured may be determined from the samples. After the items are sampled, the measured response variable for each of the samples may be provided to the computer, and the computer can calculate an estimate of the KDR, so that the estimate of the KDR can be compared to the KDR that was calculated. After providing the computer with the measured response variable for each of the samples, a point estimate of a process defect rate for the items that are manufactured also may be calculated based on the measured response variable for each of the samples.

The present invention may be embodied in one or more spreadsheets with an efficient user interface. The spreadsheets may be used in lieu of the ANSI/ASQ Z1.9 standard, to allow flexible sampling plans to be constructed and the results of sampling to be measured without the need to fit the desired sampling plan to conform to one of the series of charts in the ANSI/ASQ Z1.9 standard. It will be understood that the present invention may be embodied as systems, methods and/or computer program products.

BRIEF DESCRIPTION OF THE DRAWINGS

FIG. 3 is a flowchart illustrating operations for determining a bias-corrected percentile grid according to the present invention.

FIG. 4 is a flowchart illustrating operations to calculate an estimate of quality level according to the present invention.

FIG. 11B is the bottom half of a screen shot of the work sheet of FIGS. 10A and 10B, for Example 1.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The present invention can provide a simple, flexible tool to a non-statistical audience that can allow a user to both construct an appropriate variables sampling plan to meet desired needs, as well as to analyze the data once it is collected. Specifically, the present invention can allow the user to prescribe the Acceptable Quality Limit (AQL), Key Defect Rate (KDR), the power of the test, and the level (also referred to as either a type I error or the false alarm rate) of the test. These four values may then be used to determine the required sample size as well as the critical value for the test statistic.

Moreover, according to the invention, the user can specify a sample size, and given the AQL, power and false alarm rate, determine the resulting KDR. This aspect of the invention can enable the user to evaluate the adequacy of a specific sample size for the particular items being manufactured.

The above-described parameters may be calculated, according to the invention, using a central t distribution and extensive Monte Carlo simulation that can provide the user with a flexible, efficient, non-tabulated tool to monitor and maintain the AQL of a process via acceptance sampling.

The sampling plans may be constructed using Microsoft® Excel workbooks or other spreadsheets, so that special statistical software need not be used and the wide range access of users to Microsoft Office software may be leveraged.

In the Detailed Description that follows, a General Overview of the present invention will first be provided. Then, a Detailed Theoretical Description will be provided. Finally, a Detailed Description of a User Interface for the present invention will be provided.

1. General Overview

Figure 1:
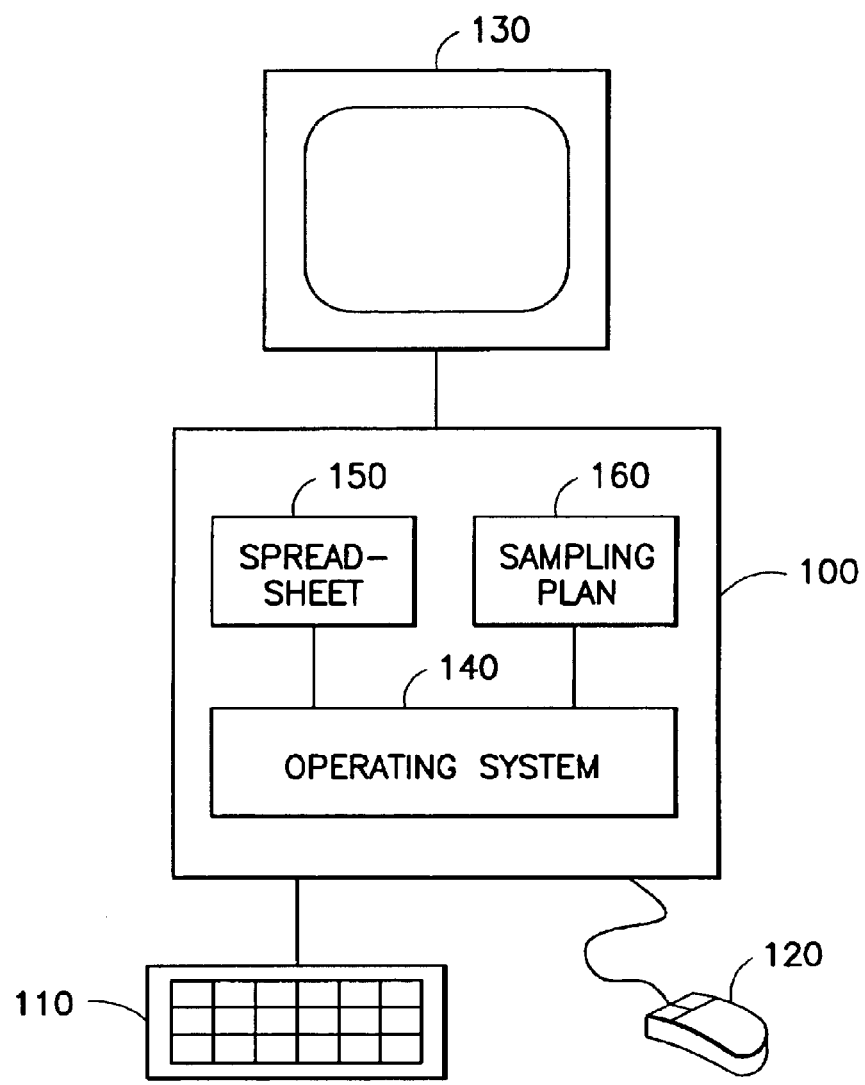
FIG. 1 is a simplified block diagram of systems, methods and computer program products for constructing sampling plans for items that are manufactured according to the present invention.

Referring now to FIG. 1, a simplified block diagram of the present invention is shown. As shown in FIG. 1, systems, methods and computer program products for constructing a sampling plan for items that are manufactured, according to the invention, may be provided using a personal computer including a Central Processing Unit (CPU) 100, a keyboard 110, a mouse 120 and/or other user input devices, and a display 130 and/or other user output devices. The CPU 100 may include an operating system 140 and a spreadsheet 150. Sampling plans 160 according to the present invention may be included, for example, as spreadsheet workbooks.

In a preferred embodiment of the present invention, the CPU 100 may be a standard IBM-compatible, Apple or other personal computer, the operating system may be Microsoft Windows and the spreadsheet 150 may be Microsoft Excel. However, it will be understood that other general purpose computers, including mainframe, midrange, workstation and/or personal computers and/or one or more applications running on one or more of these computers, and/or special purpose hardware may be used.

Various aspects of the present invention are illustrated in detail in the following figures, including flowchart illustrations. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions also may be stored in a computer-readable memory that can direct a processor or other programmable data processing apparatus to function in a particular manner, such that the instructions stored in the computer-readable memory produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It also will be understood that each block of the flowchart illustrations, and combinations of blocks in the flowchart illustrations, can be implemented by special purpose hardware-based computer systems which perform the specified functions or steps, or by combinations of special purpose hardware and computer instructions.

Prior to providing a general overview of the present invention, an overview-of terms, symbols and abbreviations common to this statistical field are listed in Table 1:

TABLE 1

| Term/Symbol/Abbreviation | Meaning |
| --- | --- |
| Defect | Any item that does not meet all relevant acceptance criteria |
| AQL | Acceptable quality limit. The numerical value for the process defect rate used to calibrate the false alarm rate of the sampling plan |
| KDR | Key defect rate. The smallest value for the process defect rate that will be detected with a preset "high probability" when using the sampling plan. The numerical value for the process defect rate used to calibrate the power of the sampling plan |
| $H_0$ | Null hypothesis. The statement being tested. Usually, this claim contains an "equality". |
| $H_1$ | Alternate hypothesis. A statement in opposition to the to the null hypothesis. Usually, this is the claim hoped to be proven; hence it is sometimes referred to as the Research hypothesis. In quality settings, this is usually connected with a process shift that must be detected. |
| $\alpha$ | Type I error. The probability of rejecting a lot when the process defect rate equals AQL. Also called the false alarm rate. |
| $\beta$ | Type II error. The probability of accepting a lot when the process defect rate equals KDR. |
| power | The probability of rejecting a lot when the process defect rate equals the KDR. |
| n | The sample size. |
| p | The true, albeit unknown, process defect rate. |
| left-sided | A setting where only a lower specification limit is used. |
| right-sided | A setting where only an upper specification limit is used. |
| two-sided | A setting where both lower and upper specification limits are used. |
| OC curve | Operating Characteristic Curve. A plot of the relationship between the type II error for the test (vertical axis) and the defect rate (horizontal axis). |
| AOQ curve | Average outgoing Quality Curve. A plot of the relationship between the long-term outgoing defect rate (vertical axis) and the defect rate (horizontal axis) |
| AOQL | Average Outgoing Quality Limit. The maximum long-term expected outgoing defect rate. |
| Attributes Data | |
| X | The number of defective items in the sample. |
| c | The acceptable number of defective items in the sample. Also called the decision rule critical value. |
| Variables Data | |
| $\hat{p}$ | The estimate for the process defect rate. Also called the quality level, or QL, estimate. |
| $k_L$ | The lower specification limit for the response variable in original units. |
| $k_U$ | The upper specification limit for the response variable in original units. |
| K | The decision rule critical value. |

TABLE 1-continued

| Term/Symbol/ Abbreviation | Meaning |
| --- | --- |
| $\hat{y}$ | The mean, or average, of the sample data. |
| s | The standard deviation of the sample data. |

It will be understood by those having skill in the art that Variables Data relates to continuous measurements of various parameters, whereas Attributes Data relates to integer values of actual results.

Figure 2:
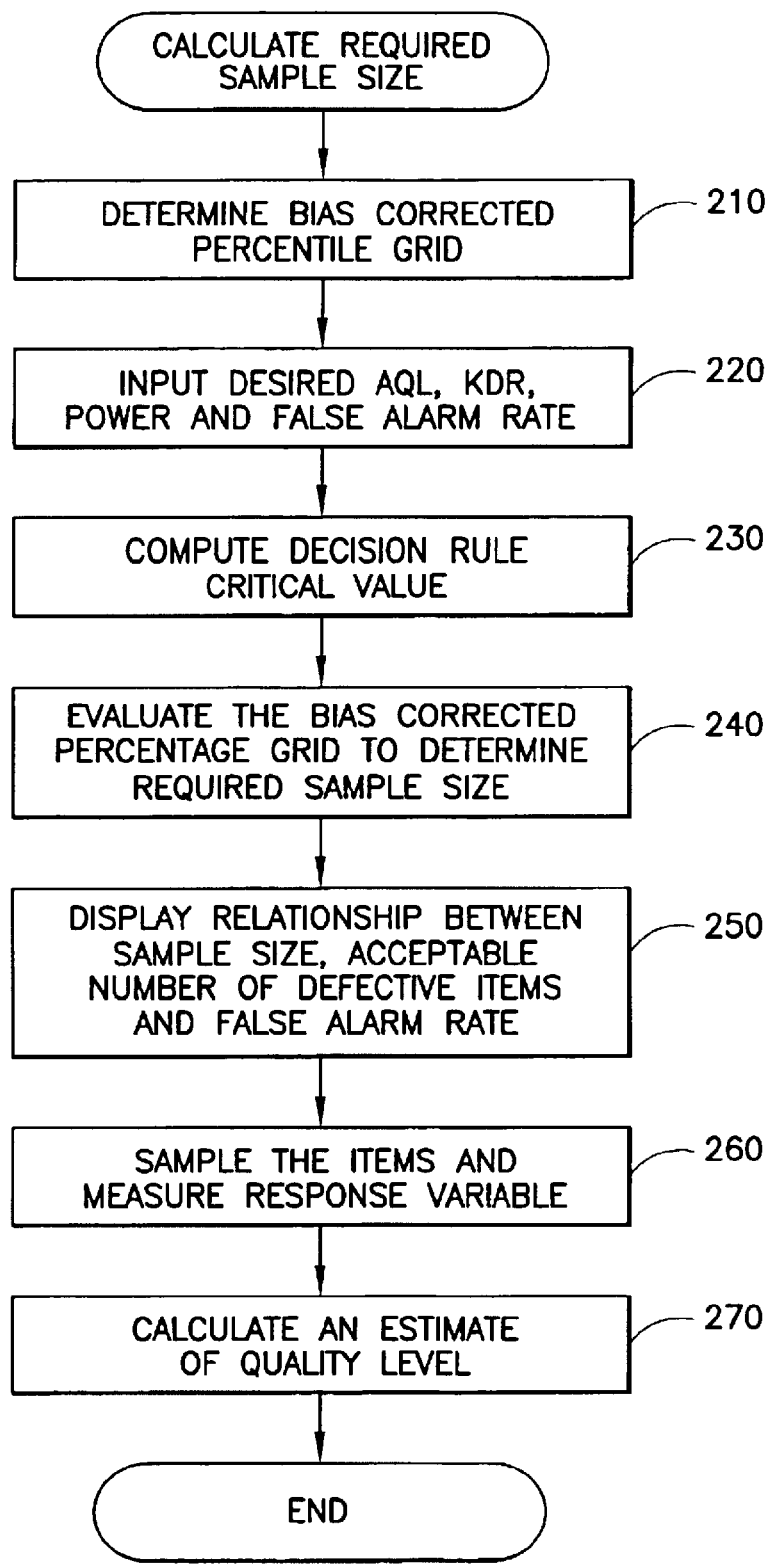
FIG. 2 is a flowchart illustrating operations for calculating a required sample size according to the present invention.

The present invention may be used to determine a required sample size and also to determine a KDR. FIG. 2 is a flowchart of operations for calculating a required sample size according to the present invention. In general, a bias-corrected percentile grid is determined and input into the computer at Block 210. At Block 220, the desired AQL, KDR, power and false alarm rate are input into the computer. At Block 230, a decision rule critical value is computed based upon the required sample size to provide the desired AQL, the desired KDR, the desired power and the desired false alarm rate. The decision rule critical value preferably is determined across a plurality of sample sizes using the bias-corrected percentile grid of sample size and a true process defect rate. Then, the bias-corrected percentile grid is evaluated for the decision rule critical value to determine the required sample size.

In particular, the decision rule critical value, K, is computed based on the numerical values for AQL and α, across several potential sample size values. For a selected sample size, the bias corrected percentile grid is used to obtain the numerical value for K, where p equals AQL and the percentile used is 1-α. Interpolation may be used when necessary. Given K, the bias corrected percentile grid is evaluated with p=KDR and the percentile equaling the power. This second grid result should equal K for one particular sample size. Again, interpolation may be used when necessary.

Continuing with the description of FIG. 2, at Block 250, the relationship between the sample size, acceptable number of defective items and false alarm rate optionally is displayed. Other relationships also may be displayed in a graphical and/or table format. At Block 260, the items are sampled and the response variable is measured. Finally, at Block 270, the measured response variable for each of the samples is input into the computer and a calculation is made of an estimate of a quality level (QL) of items that are manufactured, based on the measured response variable for each of the samples.

Referring now to FIG. 3, details of determining the bias-corrected percentage grid (Block 210 of FIG. 2) will now be described. At Block 310, a sampling distribution that is variance invariant is calculated. It is assumed that the response variable of interest from a process possesses a normal distribution with mean $\mu$ and variance $\sigma^2$. It also is assumed that the response variable is given certain specification limits, namely a lower specification limit, $k_L$, and/or an upper specification limit, $k_U$. The true underlying proportion, p, of non-conforming (i.e. out-of-specification or defective) items produced by the process is a function of both $\mu$ and $\sigma^2$. Specifically, any of these three parameters can be solved for given numerical values for the other two parameters. A preliminary Monte Carlo study concluded that for a fixed value of p, the sampling distribution for the (left-sided case) statistic $$\hat{p} = P\left(T^* \le \frac{k_L - \bar{y}}{s\sqrt{1 + \frac{1}{n}}}\right), \text{ with } T^* \sim t_{n-1},$$

is invariant to the selection of $\sigma^2$. The right-sided and two-sided cases follow analogously.

The mathematical form of the distribution characterizing $\hat{p}$ is presently unknown, except by a vague and very complex expression. However, Monte Carlo simulation may be used to estimate the percentiles of the cumulative distribution for $\hat{p}$, as well as to estimate the expected value for $\hat{p}$. Both are functions of the sample size, n, as well as the true process defect rate, p. Therefore, at Block 320, a percentile grid is established in three dimensions: (1) the sample size, (2) the true process defect rate, and (3) the percentile to be referenced.

Unfortunately, the point estimate $\hat{p}$ is a biased estimate, specifically an overestimate, of the true process defect rate p. However, $\hat{p}$ is asymptotically unbiased; that is, the bias goes to zero as the sample size gets large. For each value of p, a regression model of the bias as a function of the sample size may be used to determine the multiplication constant needed to eliminate the bias. Thus, at Block 330, a bias corrected percentile grid is constructed by taking the Monte Carlo based percentile grid and multiplying each entry by an appropriate constant.

Referring now to FIG. 4, detailed operations to calculate an estimate of quality level (Block 270 of FIG. 1) will now be described. In particular, a bias-correction coefficient, based on the assumption that p=AQL, is computed at Block 410. The QL test statistic is then computed at Block 420 as a function of this bias-correction coefficient and quantile(s) from the cumulative distribution function of the central t-distribution with an argument(s) that is/are a function of the sample mean, sample standard deviation, sample size, and specification limit(s). Finally, at Block 430, the decision rule is defined as follows: reject the hypothesis that the process is operating under the condition of an AQL defect rate if and only if the QL test statistic is greater than or equal to the decision rule critical value, K. Otherwise, the process is deemed to be operating under an acceptable defect rate.

Figure 5:
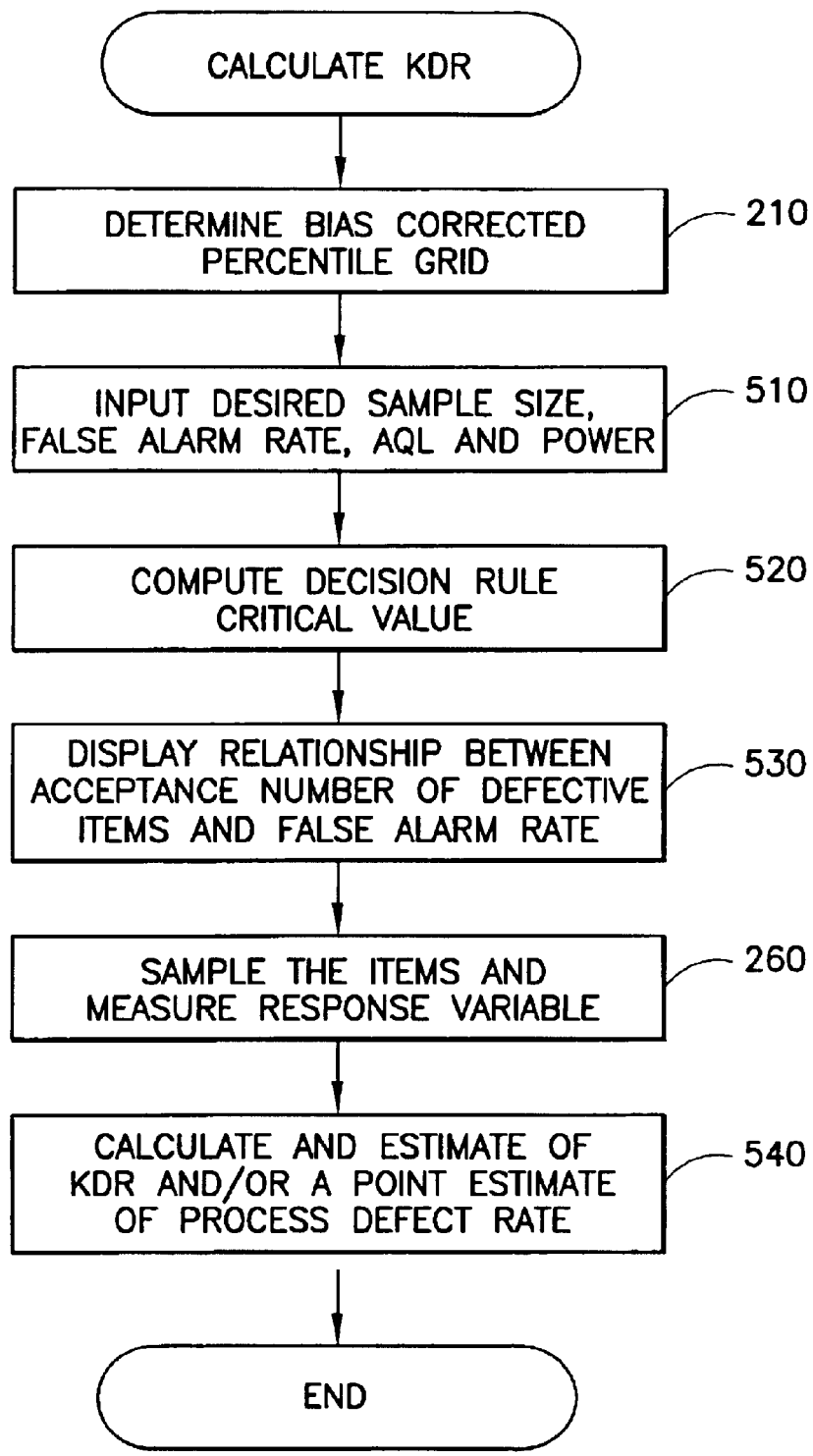
FIG. 5 is a flowchart illustrating operations for calculating a KDR according to the present invention.
Figure 6B:
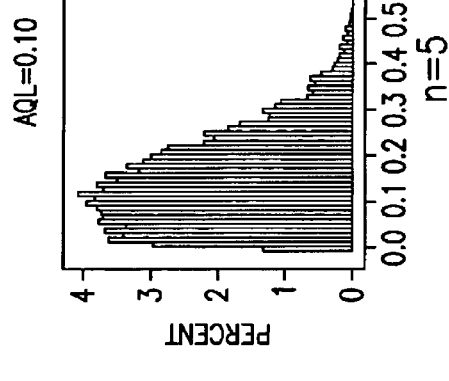
FIGS. 6A–6F graphically illustrate histograms of Monte Carlo replicates that indicate the shape of a probability distribution function for $\hat{p}$.
Figure 6D:
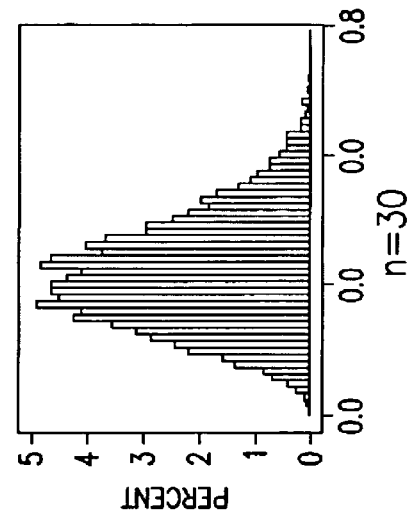
Figure 6A:
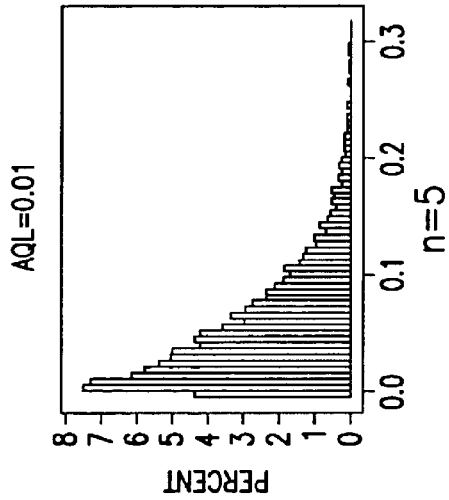
Figure 6C:
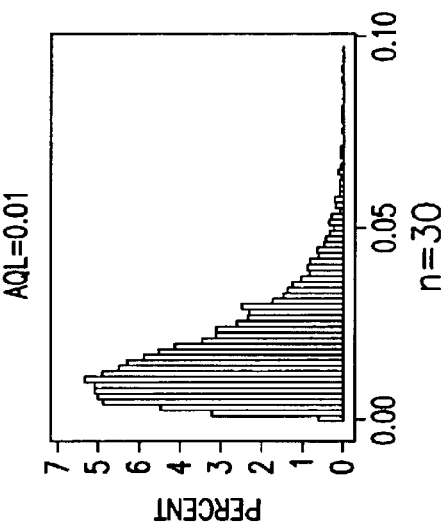
Figure 6F:
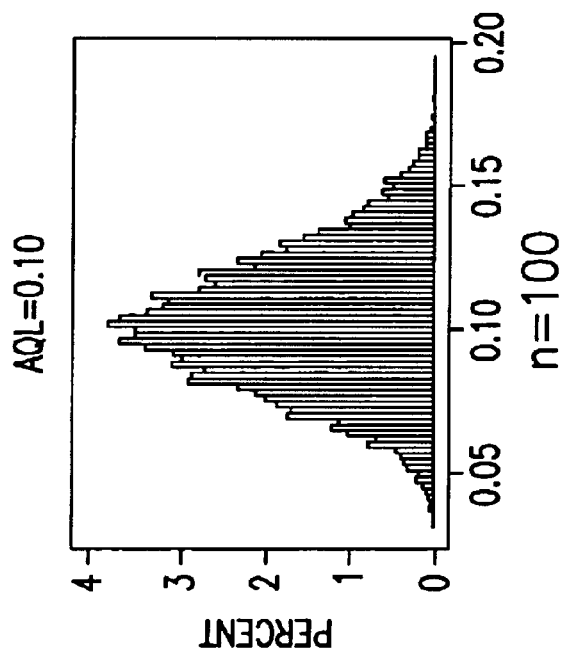
Figure 6E:
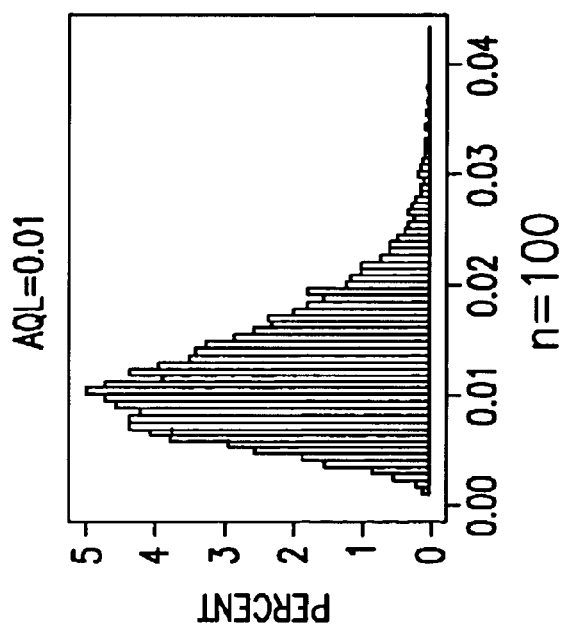

Referring now to FIG. 5, according to another aspect of the present invention, the KDR that is produced from a desired sample size, a desired false alarm rate, a desired AQL and a desired power, may be calculated As shown in FIG. 5, a bias-corrected percentile grid may be calculated at Block 210, as was described in connection with FIGS. 2 and 3. It will be understood that the calculation of the bias-corrected percentage grid may only need to be performed once and then may be used for all subsequent evaluations and calculations. Then, at Block 510, an acceptable AQL, a desired false alarm rate (α), a desired sample size (n), and a desired power at the unknown KDR are input into the computer.

At Block 520, the decision rule critical value is computed based on the desired AQL and the desired false alarm rate for the desired sample size. In particular, the decision rule critical value, K, based on the numerical values for AQL, and α is computed for the given sample size. The bias corrected percentile grid is used to obtain the numerical value for K, where p equals AQL and the percentile used is 1-α. Interpolation may be used when necessary. Given K, the bias corrected percentile grid is now evaluated across several values of p>AQL, with the percentile equaling the power. This second grid result should equal K for one particular value of p, which becomes the computed value for the KDR. Again, interpolation may be used when necessary.

Continuing with the description of FIG. 5, optionally at Block 530, a relationship between acceptable number of defective items and false alarm rate may be displayed. Alternatively, other relationships may be displayed.

Then at Block 260, the items are sampled and the response variables are measured as was described in connection with FIG. 2. Finally at Block 540, a KDR that is produced from the desired sample size, the desired false alarm rate, the desired AQL and the desired power of the sampling plan is calculated. More particularly, an estimate of the KDR is calculated for the items that are manufactured based on the measured response variable for each of the samples. Moreover, a point estimate of a process defect rate for the items that are manufactured may be calculated based on the measured response variable for each of the samples. These parameters may be displayed.

In particular, to obtain a point estimate for the process defect rate, an alteration of the QL test statistic may be performed. This is due to the form of bias-correction coefficient, which no longer may utilize the assumption that p=AQL that results from the formal hypothesis test. A family of reference regression models (each defined by the sample size) of the true defect rate versus the expected value of $\hat{p}$ is constructed based on the Monte Carlo results that produced the original percentile grid. The QL point estimate, $\hat{Q}_L$, is a transformation of $\hat{p}$. For the given sample size, the coefficients from the appropriate reference regression model may be used to transform $\hat{p}$ into $\hat{Q}_L$. Interpolation may be used as necessary.

2. Detailed Theoretical Description

A detailed theoretical description of the statistical theory underlying the present invention now will be provided.

The process parameter of interest is the probability, p, that an individually produced item is not within specifications. Hence, p is referred to as the process defect rate. Generally, it is only desirable to protect against an excessively large value for p. The formal hypothesis statement takes the form of a one-sample proportion test, namely $H_0$: $p=p_0$ $H_1$: $p=p_1>p_0$ where $p_0$ equals the acceptable quality level, or AQL. The false alarm rate, α, for this test is controlled at a specific level under the circumstance that p=AQL. Furthermore, the power of this test is calibrated when the process defect rate equals a value referred to as the key defect rate, or KDR. Thus, p=KDR, where KDR=$p_1>p_0$.

There are two scenarios to be considered when constructing the sampling plan. In both cases the AQL, α, and power are fixed in advance. In the first case, the KDR is specified in advance and the required sample size is computed. In the second case, the sample size is specified in advance with the resulting KDR being computed. In either case, it is of interest to estimate the unknown process parameter p from the observed (collected) data during the data analysis.

2.1 Test Procedure Developmental Theory

Assume that a lower one-sided specification limit is employed. Let $\hat{p}=P(y \leq k_L)$ be a point estimate for p, where $k_L$ represents the lower specification limit and y represents any future observation. Assume that the response variable is normally distributed with mean μ and variance σ², written as y~N[μ, σ²], and that the observations are all independent of one another. From distribution theory, with $\bar{y}$ being the sample mean and s being the sample standard deviation arising from a sample of n observations:

$$y - \bar{y} \sim N\left[0, \sigma^2 + \frac{\sigma^2}{n}\right]$$

and $$\frac{(n-1)s^2}{\sigma^2} \sim \chi^2_{n-1}.$$

So, $$T^* = \frac{y - \bar{y}}{s\sqrt{1 + \frac{1}{n}}} = \frac{\sigma\sqrt{1 + \frac{1}{n}}}{\sqrt{\frac{(n-1)s^2}{\sigma^2}}} \sim \frac{N[0,1]}{\sqrt{\frac{\chi^2_{n-1}}{n-1}}} \sim t_{n-1}.$$

Then, $$\hat{p} = P\left(T^* \leq \frac{k_L - \bar{y}}{s\sqrt{1 + \frac{1}{n}}}\right), \text{ with } T^* \sim t_{n-1}.$$

It is noted that the test statistic is the cumulative distribution function, or cdf, value of a t statistic at some specific value, but it is not a t statistic itself.

The right-sided and two-sided cases may follow analogously. For the two-sided specification case, the test statistic is:

$$\hat{p} = 1 - P\left(\frac{k_L - \bar{y}}{s\sqrt{1 + \frac{1}{n}}} \leq T^* \leq \frac{k_U - \bar{y}}{s\sqrt{1 + \frac{1}{n}}}\right)$$

while for the right-sided specification case, the test statistic is:

$$\hat{p} = P\left(T^* \geq \frac{k_U - \bar{y}}{s\sqrt{1 + \frac{1}{n}}}\right).$$

In both cases, $k_U$ represents the upper specification limit. The sample statistic $\hat{p}$ may be the foundation on which to build a new test procedure.

2.2 The Decision Rule

A goal of the present invention is to provide a sample statistic that can truly estimate the process defect rate, not just some artificial statistic constructed via distribution theory, while not requiring relinquishing power as compared to the ANSI test procedure. A primary benefit can be a better understanding of the ramifications on product quality of a particular numerical value for the sample statistic. The hypothesis testing procedure chooses between the AQL and KDR values as to which is the more appropriate description of the underlying process defect rate. The critical value, K, for the hypothesis test falls between the AQL and KDR, where the value for K also can provide information concerning sampling plan precision (in meaningful terms) to the user. Specifically, the user can know that certain process defect rates above the AQL will likely be indistinguishable from the AQL.

Overall, the hypothesis test is right-tailed, with the statement "the process defect rate equals the AQL" being rejected whenever the sample statistic exceeds the critical value. Whether the actual specifications for the response variable themselves are one-sided or two-sided can be immaterial regarding this decision rule.

The value of K is derived from the null distribution (i.e. assuming that p=AQL) of the test statistic. The right-tailed region of this distribution having an area of $\alpha$ provides the appropriate value for K in order to obtain a hypothesis test at an $\alpha$ level of significance. To attain a specific power for the test, the alternate distribution of the test statistic, evaluated at p=KDR, is used.

As stated above, either the KDR or the sample size may be fixed in advance. Given the KDR, the power determines the sample size, which in turn is used with the AQL and $\alpha$ to compute K. Alternately, given the sample size, K can be computed directly from the AQL and $\alpha$. In this case, calculating the KDR for a specific power is useful in determining the adequacy of the sampling plan, but the value of the KDR may have no direct bearing on the decision rule.

2.3 The Sampling Distribution of $\hat{p}$

To incorporate the sample statistic $\hat{p}$ into a formal hypothesis test, the sampling distribution for $\hat{p}$ is obtained. Unfortunately, the mathematics may become complex. Assuming a left-sided specification case, the cumulative distribution function, G, for $\hat{p}$ is:

$$G(w) = \int_0^w g\left(\int_{-\infty}^{\frac{k_L - y}{s\sqrt{1+\frac{1}{n}}}} f(t) dt \right) dz,$$

where g(z) is the probability density function for $\hat{p}$ and f(t) is the probability density function of a t distribution having n-1 degrees of freedom. However, the form of the function g(z) is generally unknown.

Without an expression (closed-form or otherwise) to define the sampling distribution for $\hat{p}$, Monte Carlo simulation may be employed as one method of circumventing the complex distribution theory. There is, however, one assumption that should be met, as will now be described.

Setting the process defect rate to some constant value has the effect of fixing the tailed area(s) under a normal curve to this constant value. As the normal distribution is a two-parameter ($\mu$, $\sigma^2$) distribution, there are an infinite number of ($\mu$, $\sigma^2$) pairs that will satisfy this tailed area criterion. However, if $\mu$ is also fixed, then $\sigma^2$ can be solved for explicitly, and vice versa. A result from a previous Monte Carlo simulation study is that the sampling distribution for $\hat{p}$ is invariant to the selection of the ($\mu$, $\sigma^2$) pair. For the sake of simplicity, $\sigma^2$ can therefore be arbitrarily set to 1, with $\mu$ computed directly from the true process defect rate. The random normal variates used in the Monte Carlo simulation are then fully defined.

Monte Carlo simulation produces an empirical sampling distribution for $\hat{p}$ that is a function of both the sample size and the true process defect rate, p. The $100(1-\alpha)^{th}$ percentile of the empirical cumulative distribution function, or ecdf, for $\hat{p}$ can be used for determining K.

To illustrate the sampling distribution of $\hat{p}$ graphically, consider two process defect rates (0.01 and 0.10) along with three sample sizes (5, 30, and 100). FIGS. 6A through 6F represent histograms of the Monte Carlo replicates (10,000 for each case) and indicate the shape of the probability distribution function for $\hat{p}$. It appears as though smaller sample sizes exhibit more right-skewedness than do larger sample sizes. It also appears that as the process defect rate becomes larger (and fixing the sample size), symmetry and normality are more closely adhered. Overall, the suggestion is that the sampling distribution for $\hat{p}$ is unimodal. Given that $\hat{p} \geq 0$, many continuous distributions, such as the Gamma and Weibull, could be investigated as to their potential use as approximations. Since, $0 \leq \hat{p} \leq 1$ is the real domain for $\hat{p}$, a logical choice would be a Beta distribution. Further discussion concerning the modeling of the sampling distribution of $\hat{p}$ will be presented in Section 2.7.2.

2.4 The Bias of $\hat{p}$

Distribution theory suggests that $\hat{p}$ estimates p, but Monte Carlo simulation reveals an interesting fact: $\hat{p}$ is a biased estimator of p. This fact is illustrated in both Table 2A and Table 2B, where the mean of the Monte Carlo replicates for the three illustrative sample sizes are all above the true value for p (for either p=0.01 or p=0.10). These outputs also show that the means approach the true value of p as the sample size increases. This means that $\hat{p}$ is an asymptotically unbiased estimator of p.

TABLE 2A

Descriptive Statistics for Monte Carlo Replicates when p = 0.01.

| Variable | N | Mean | Median | TrMean | StDev | SE Mean |
|---|---|---|---|---|---|---|
| n = 5 | 10000 | 0.05367 | 0.04165 | 0.04952 | 0.04648 | 0.00046 |
| n = 30 | 10000 | 0.01685 | 0.01422 | 0.01589 | 0.01196 | 0.00012 |
| n = 100 | 10000 | 0.01196 | 0.01107 | 0.01165 | 0.00559 | 0.00006 |

| Variable | Minimum | Maximum | Q1 | Q3 |
|---|---|---|---|---|
| n = 5 | 0.00001 | 0.31664 | 0.01726 | 0.07769 |
| n = 30 | 0.00001 | 0.09197 | 0.00795 | 0.02305 |
| n = 100 | 0.00078 | 0.04245 | 0.00781 | 0.01518 |

TABLE 2B

Descriptive Statistics for Monte Carlo Replicates when p = 0.10.

| Variable | N | Mean | Median | TrMean | StDev | SE Mean |
|---|---|---|---|---|---|---|
| n = 5 | 10000 | 0.15066 | 0.13736 | 0.14530 | 0.09877 | 0.00099 |
| n = 30 | 10000 | 0.10936 | 0.10614 | 0.10820 | 0.04161 | 0.00042 |
| n = 100 | 10000 | 0.10272 | 0.10190 | 0.10236 | 0.02331 | 0.00023 |

| Variable | Minimum | Maximum | Q1 | Q3 |
|---|---|---|---|---|
| n = 5 | 0.00002 | 0.80619 | 0.07248 | 0.21287 |
| n = 30 | 0.00779 | 0.26957 | 0.07905 | 0.13589 |
| n = 100 | 0.03693 | 0.19259 | 0.08628 | 0.11825 |

Figure 7:
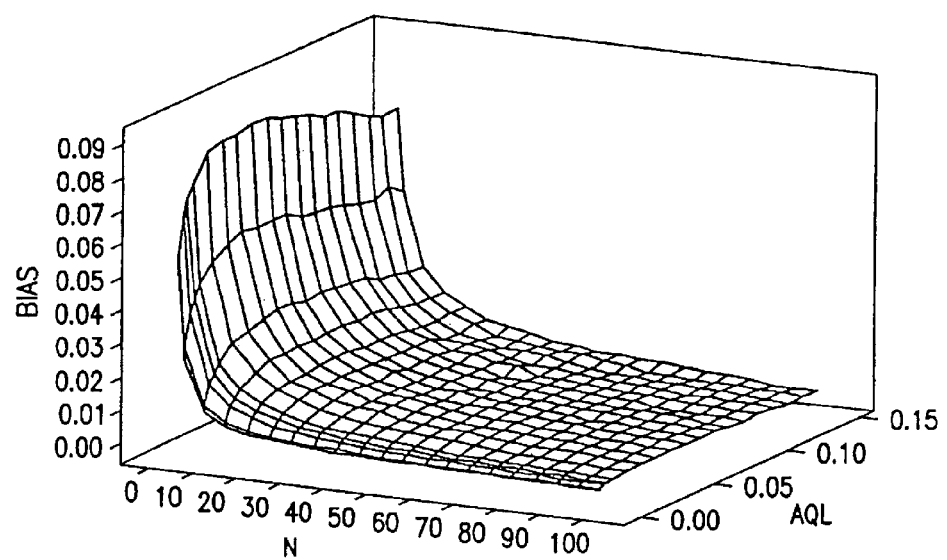
FIG. 7 graphically illustrates bias as a function of sample size, when p=AQL.
Figure 8A:
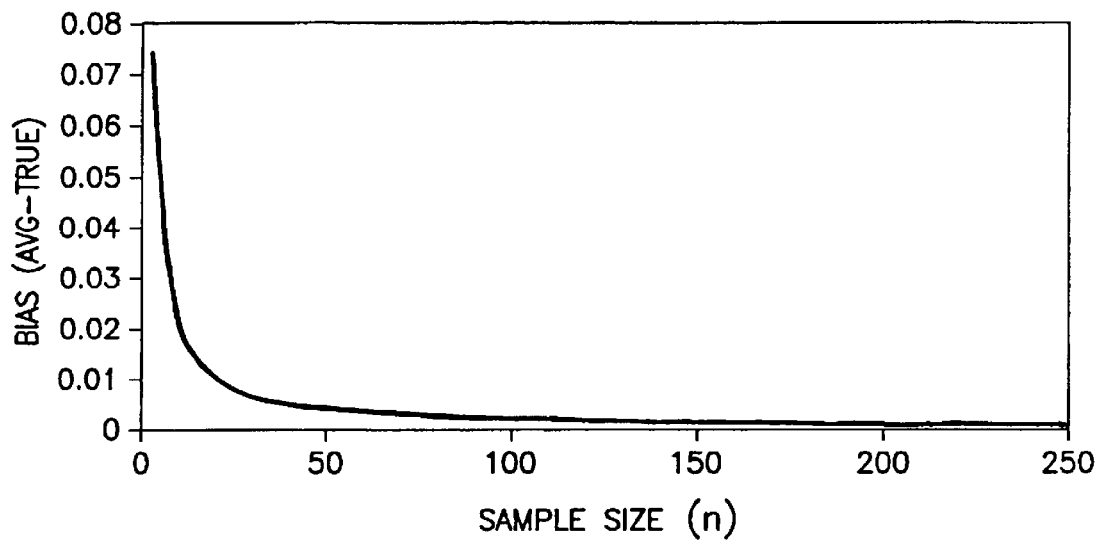
FIGS. 8A and 8B illustrate bias curves across various sample sizes for an AQL of 0.01 and 0.10, respectively.
Figure 8B:
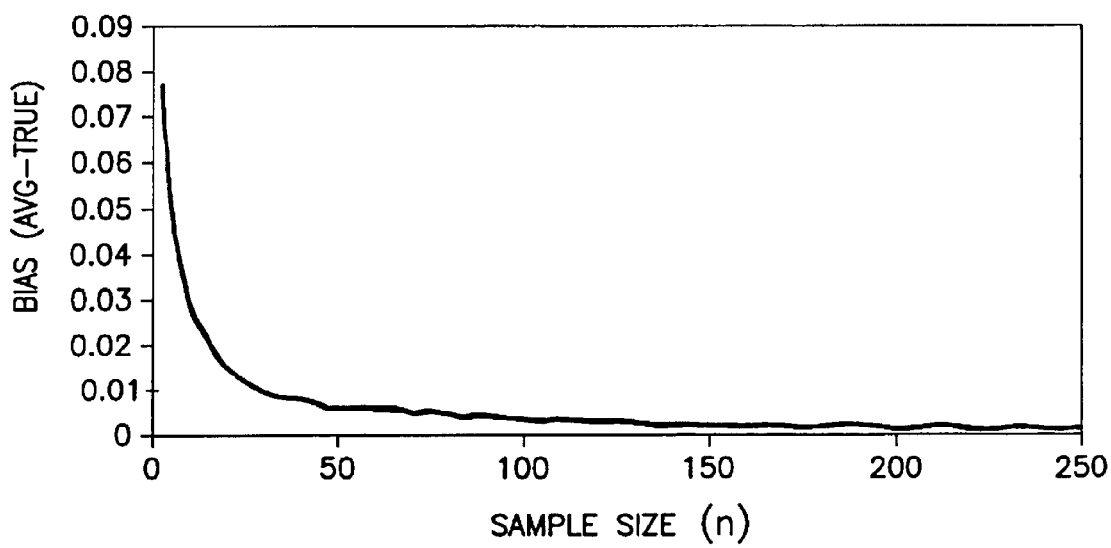

The bias is positive, meaning that on average, $\hat{p}$ will estimate the process defect rate as being slightly higher than it truly is, with the quantification of slight being a function of the sample size and, to a lesser degree, the true process defect rate. Therefore, $\hat{p}$ may be construed as being a conservative estimate of p. FIG. 7 shows the bias surface across both the sample size and the true process defect rate (here, p=AQL). In FIGS. 8A and 8B the bias trend is illustrated across various sample sizes for a fixed process defect rate.

In terms of the hypothesis testing framework, there do not appear to be any procedural difficulties stemming from the bias of $\hat{p}$. The false alarm rate and power can define the appropriate tailed regions of the null and alternate sampling distributions, respectively, and a sampling plan can be constructed. When performing the data analysis, however, an estimate of the observed process defect rate should be available. In this light, improving $\hat{p}$ is desirable, especially when dealing with small sample size scenarios.

2.5 Bias Correction Regression

Figure 9A:
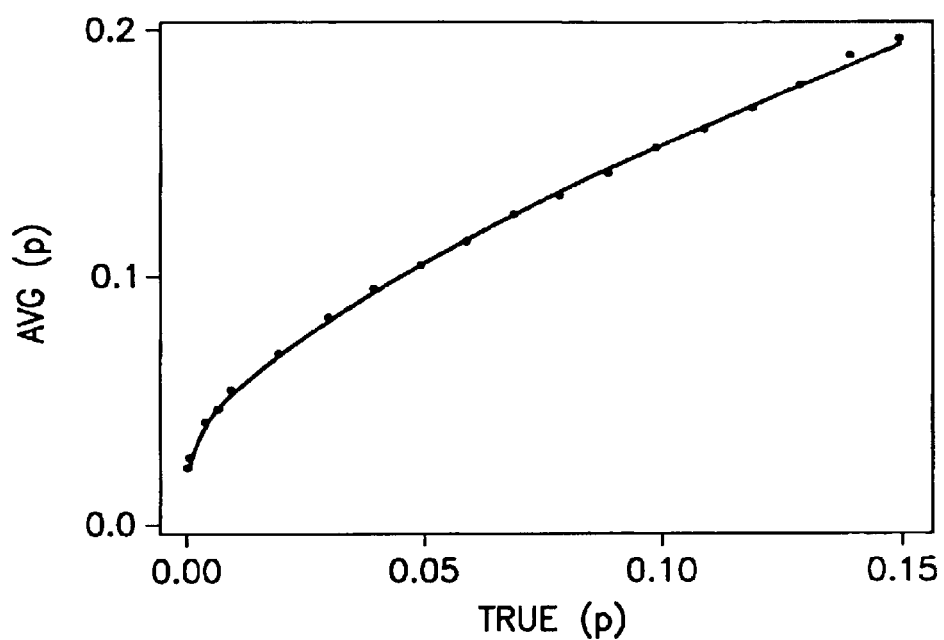
FIG. 9A graphically illustrates bias correction regression for hypothesis testing, for n=5.

For a fixed sample size, the relationship between the true value for p and the expected value for $\hat{p}$ will be described. It is determined that the relationship between log $10(E_{n,p}[\hat{p}])$ and log $10(p)$ can be expressed with a cubic polynomial linear model. FIG. 9A illustrates this relationship for a sample size of n=5. The r-square is roughly 100%, with all three model terms being significant. Hence, there may be no need for overfitting. This high degree of fit may be attained for all sample sizes.

In the hypothesis testing framework, the true value for p is assumed to be either the AQL or the KDR when determining either the null distribution or the alternate distribution. Therefore, the assumed true value for p can be used as the independent variable in the bias correction regression, and the expected value for $\hat{p}$ can be predicted. The sample statistic $$\frac{p}{E_{n,p}[\hat{p}]}\hat{p}$$

then becomes an unbiased test statistic, where p=AQL when dealing with the null distribution and p=KDR when dealing with the alternate distribution.

Figure 9B:
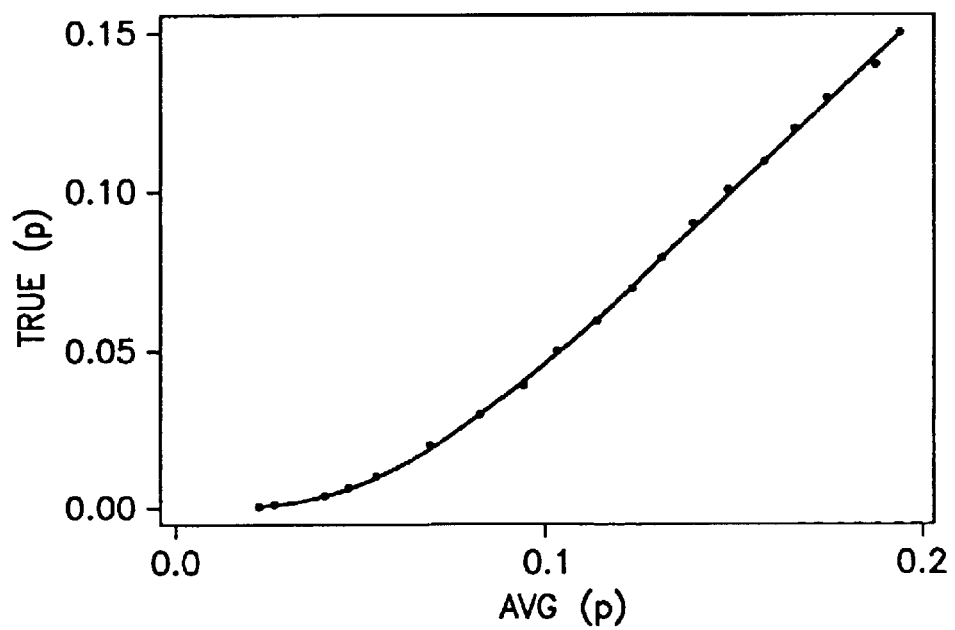
FIG. 9B graphically illustrates bias correction regression for QL estimation, for n=5.

A different problem presents itself when the post-sampling data analysis is performed. When estimating the process defect rate, the bias correction regression is reversed. Since p is unknown, it may not be used as an independent variable. Using the sample statistic $\hat{p}$ as the independent variable $E_{n,p}[\hat{p}]$, the true value for p can be estimated. FIG. 9B shows that a cubic polynomial linear model (again with dual log 10 transformations) performs well here as well.

There may be one inherent difficulty with the second bias correction regression technique: the distribution of $\hat{p}$ is not symmetric, thus replacing $E_{n,p}[\hat{p}]$ by $\hat{p}$ may not eliminate the bias, only help to reduce it.

2.6 The Percentile Grid

The Monte Carlo simulation study to estimate the sampling distribution for $\hat{p}$ involves a rather extensive set of (n, p) pairs. Specifically, the sample sizes included in the study are n=3, 5(5)400(10)1000(200)2400, 2500. The process defect rates included in the study are p=0.0005, 0.001, 0.004, 0.0065, 0.01(0.01)0.15. These sample sizes and process defect rates are fully crossed, with 10,000 Monte Carlo replicates of $\hat{p}$ computed for each (n, p) pair. This large number of replicates is compressed into a set of percentiles for each (n, p) pair, using these percentiles:

{0.0001, 0.0005, 0.001, 0.005, 0.01(0.01)0.99, 0.995, 0.999, 0.9995, 0.9999}

These uncorrected sets of percentiles are then filtered through an appropriate (a function of the sample size) bias correction regression equation to produce the final sets of corrected percentiles, called the percentile grid because each row represents an (n, p) pair and each column a particular percentile.

A large number of (n, p) pairs were used for two primary reasons. First, the capturing of subtle curvilinear trends is desired, especially since the problem at hand mostly involves the extremes, or tails, of sampling distributions. Second, with a fine resolution grid, a linear interpolation procedure should provide an acceptable computational method for addressing any value for n, p, or percentile not represented explicitly by the grid. Other smoothing procedures may work as well, but the trends being smoothed generally are monotone and the smoothing procedure may need to account for this. As a counterexample, local quadratic fitting may not guarantee a monotone fit.

Regarding the linear interpolation procedure, the problem is essentially three-dimensional. There is the sample size, the process defect rate, and the appropriate percentile (used to represent either the false alarm rate or power). The linear interpolation procedure used in the Excel workbooks described below incorporates a nearest neighbor weighted average computation. To accomplish this, a $2^3$ factorial cube of upper and lower grid bounds is determined to surround the point of interest. Each dimensional range is scaled to 1, then a Euclidean distance is computed for each of the cube corner points to the point of interest. Higher weights should be given to the smaller Euclidean distances. This is accomplished through the use of a harmonic mean expression of the distances (which includes a constraint to have the weights sum to one). Finally, a weighted average is calculated.

2.7 Distributional Approximations

The percentile grid method of estimating the sampling distribution of $\hat{p}$ may be considered an inelegant, brute force method. However, it may be generally desirable to have an accurate representation over an elegant representation (if the cost is accuracy). Several different methods may be used to include more elegant distributional representations of the various items of interest. These methods are summarized in the next two sections.

2.7.1 Modeling the Critical Value and the Power

A consideration was made of modeling the critical value, K, as a nonlinear function of the sample size, the AQL and the false alarm rate, and to model the power of the test as a function of the sample size, the AQL and the KDR. From a modeling standpoint, both regression models were highly successful. The general regression model for the critical value was found to be $$K \sim \beta_0 \exp\{-\beta_1 n^{\beta_2}\} + \beta_3 \sqrt{n} + \beta_4 n,$$

with the last two terms helping to stabilize the asymptotic trend. Because the power of the test is bounded between 0 and 1, there is a definite need to use a model that has a horizontal asymptote at a power equal to one. This leads to the statistical model for the power of the test being given by $$\text{power} \sim \frac{1}{1 + \gamma_0 \exp\{-\gamma_1 n^{\gamma_2}\}}.$$

Given the (AQL, KDR, $\alpha$) triple, the sample size is found via $$n = \left[-\frac{1}{\gamma_1}\ln\left(\frac{1-\text{power}}{\gamma_0 \text{power}}\right)\right]^{1/\gamma_2},$$

where $\gamma_0$, $\gamma_1$, $\gamma_2 \sim f(\text{AQL}, \text{KDR}, \alpha)$, with the function f representing the dependence of the coefficients on the values for AQL, KDR, and $\alpha$. Once the sample size is found, the critical value, K, is computed via $$K = \beta_0 \exp\{-\beta_1 n^{\beta_2}\} + \beta_3 \sqrt{n} + \beta_4 n, \text{ where } \beta_0, \beta_1, \beta_2, \beta_3, \beta_4 \sim g(AQL, \alpha),$$

with the function g representing the dependence of the coefficients on the values for AQL and α.

There may be two major difficulties with this approach. First, the false alarm generally rate adds another dimension to the modeling problem. Second, a different model may be needed for each potential value of KDR-AQL. Together, these may lead to an enormous reference grid of coefficients. A solution to the problem may be to find a unified model for the critical value, and another unified model for the power. This means that the coefficients themselves are modeled as functions of the sample size, the AQL and the false alarm rate (in the critical value case), or the sample size, the AQL, the false alarm rate and the KDR (in the power case). A unified model for the critical value was developed, but a unified power model was not developed. In any event, the noise produced through the estimation process of a unified model seemed to suggest that there would be some loss in accuracy. Hence, a different approach was warranted.

2.7.2 Modeling with Known Continuous Distributions

As stated in Section 2.3, the sampling distribution of $\hat{p}$ for a given (n, p) pair can be modeled with a continuous distribution. Even better may be the development of a unified model, where the coefficients themselves are a function of both n and p.

The two-parameter beta distribution is a logical choice for modeling the sampling distribution of $\hat{p}$ because $0 \leq \hat{p} \leq 1$. However, distributional analysis over several (n, p) pairs found that both the two-parameter Weibull distribution and the two-parameter Gamma distribution generally fit the data better than does the beta distribution. Even so, there are mixed results; sometimes the fit is very good, but other times the tails are not well represented. This is important because, due to the magnitude of both the false alarm rate and of the power, tail precision generally needs to be maintained.

A three-parameter distribution is suggested as the minimally parameterized distribution that will adequately describe the sampling distribution of $\hat{p}$. The three-parameter Weibull distribution and the generalized three-parameter beta distribution also may be considered. These distributions may include a true third parameter to aid in shape description, not just a "phase shift" parameter that moves the domain, but does not impact on the shape.

Accordingly, the percentile grid presently provides a more accurate estimation algorithm than other continuous distribution representations.

2.8 The QL Test

To summarize Sections 2.1–2.7.2, the test statistic used to discriminate between the AQL and the KDR is defined to be $$\hat{QL}_0 = \frac{AQL}{\hat{E}_{AQL,n}[\hat{p}]} \hat{p},$$

where $\hat{p}$ is as defined in Section 2.1, and $\hat{E}_{AQL,n}[\hat{p}]$ is the predicted expected value for $\hat{p}$ as computed via the bias correction regression equation (conditioned on n) outlined in Section 2.5 under the assumption that p=AQL.

The decision rule is to reject the null hypothesis that the process defect rate equals the AQL provided that $\hat{QL}_0 > K$. The value of K is determined via the percentile grid, with linear interpolation used whenever necessary.

The actual quality level point estimate is defined as:
$$\hat{QL} = 10^{\theta_0 + \theta_1 \log 10(\hat{p}) + \theta_2 (\log 10(\hat{p}))^2 + \theta_3 (\log 10(\hat{p}))^3},$$

where θ is a function of the sample size. As stated before, this is a conservative estimate of the process defect rate since, on average, the true process defect rate is slightly less than this estimated value.

3. Detailed Description of User Interface

The user interface preferably includes three customized Microsoft Excel workbooks, as follows:

Attributes_SP.xls, creates sampling plans for attributes data.

Variables_SP.xls, creates sampling plans for variables data.

Variables_DA.xls, analyzes variables data via the QL test.

However, other spreadsheet programs or other applications programs or custom programs maybe used.

Attributes data, being dichotomous in nature, are evaluated with respect to binomial distribution theory (assuming "infinite" lot sizes). This is consistent with the widely accepted methodology for producing sampling plans.

Variables data preferably is analyzed via the QL test, as was described above. The usual normal distribution framework still applies, but an improvement in power and a vast improvement in flexibility may be provided over the ANSI standard approach.

An overview of the hypothesis test framework as it pertains to either attributes data or variables data first will be presented.

3.1 Attributes Data

The hypothesis test is of the form $H_0$: p=AQL,
$H_1$: p>AQL, with the lot being rejected if X>c. Following the binomial distribution for large lot sizes, the false alarm rate, or type I error, is determined from the relation $$\alpha = \sum_{x=c+1}^{n} \binom{n}{x} AQL^x (1 - AQL)^{n-x}.$$

With c fixed and β set for a prescribed KDR, the sample size is determined, regardless of the AQL, by solving the following expression for n:

$$\beta = \sum_{x=0}^{c} \binom{n}{x} KDR^x (1 - KDR)^{n-x}.$$

Without a closed-form expression, the sample size can be computed in an iterative manner.

3.2 Variables Data

The hypothesis test is of the form $H_0$: p=AQL,
$H_1$: p>AQL.

For a left-sided specification case, the test statistic for the QL test is $$\hat{p} = P\left(T^* \leq \frac{k_L - \bar{y}}{s\sqrt{1 + \frac{1}{n}}}\right), \text{ with } T^* \sim t_{n-1}.$$

It is noted that the test statistic is the cdf (cumulative distribution function) value of a t statistic at some specific value, but it is not a t statistic itself.

For the two-sided specification case the test statistic is $$\hat{p} = 1 - P\left(\frac{k_L - \bar{y}}{s\sqrt{1 + \frac{1}{n}}} \leq T^* \leq \frac{k_U - \bar{y}}{s\sqrt{1 + \frac{1}{n}}}\right), \text{ with } T^* \sim t_{n-1}.$$

Finally, for the right-sided specification case the test statistic is $$\hat{p} = P\left(T^* \geq \frac{k_U - \bar{y}}{s\sqrt{1 + \frac{1}{n}}}\right), \text{ with } T^* \sim t_{n-1}.$$

The decision rule is one-sided regardless of whether the specifications are left-sided, right-sided, or two-sided. Namely, the lot is rejected if $\hat{p} > K$.

4. Overview of the Microsoft Excel Workbooks

As stated above, three (3) Microsoft Excel workbooks may be provided:

Attributes_SP.xls, creates sampling plans for attributes data.

Variables_SP.xls, creates sampling plans for variables data.

Variables_DA.xls, analyzes variables data via the QL test.

There need be no Attributes_DA.xls file because there generally is no need for a data analysis spreadsheet when the attributes decision rule is simply whether or not the number of observed defectives exceeds some critical value.

Section 5 contains detailed illustration of how various scenarios are addressed with these workbooks.

Figure 10A:
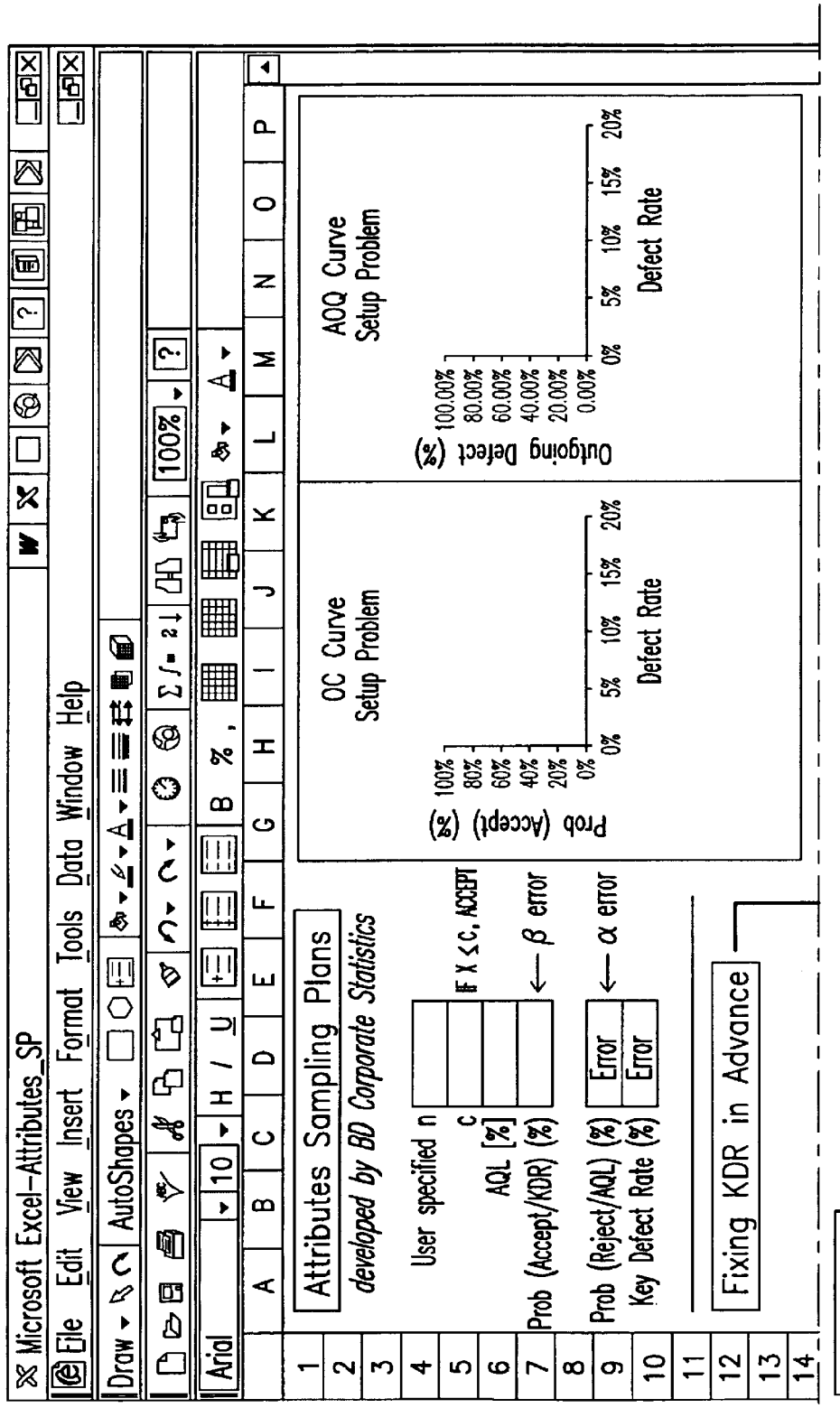
FIG. 10A is the top half of a screen shot of an attributes work sheet according to the present invention.
Figure 10B:
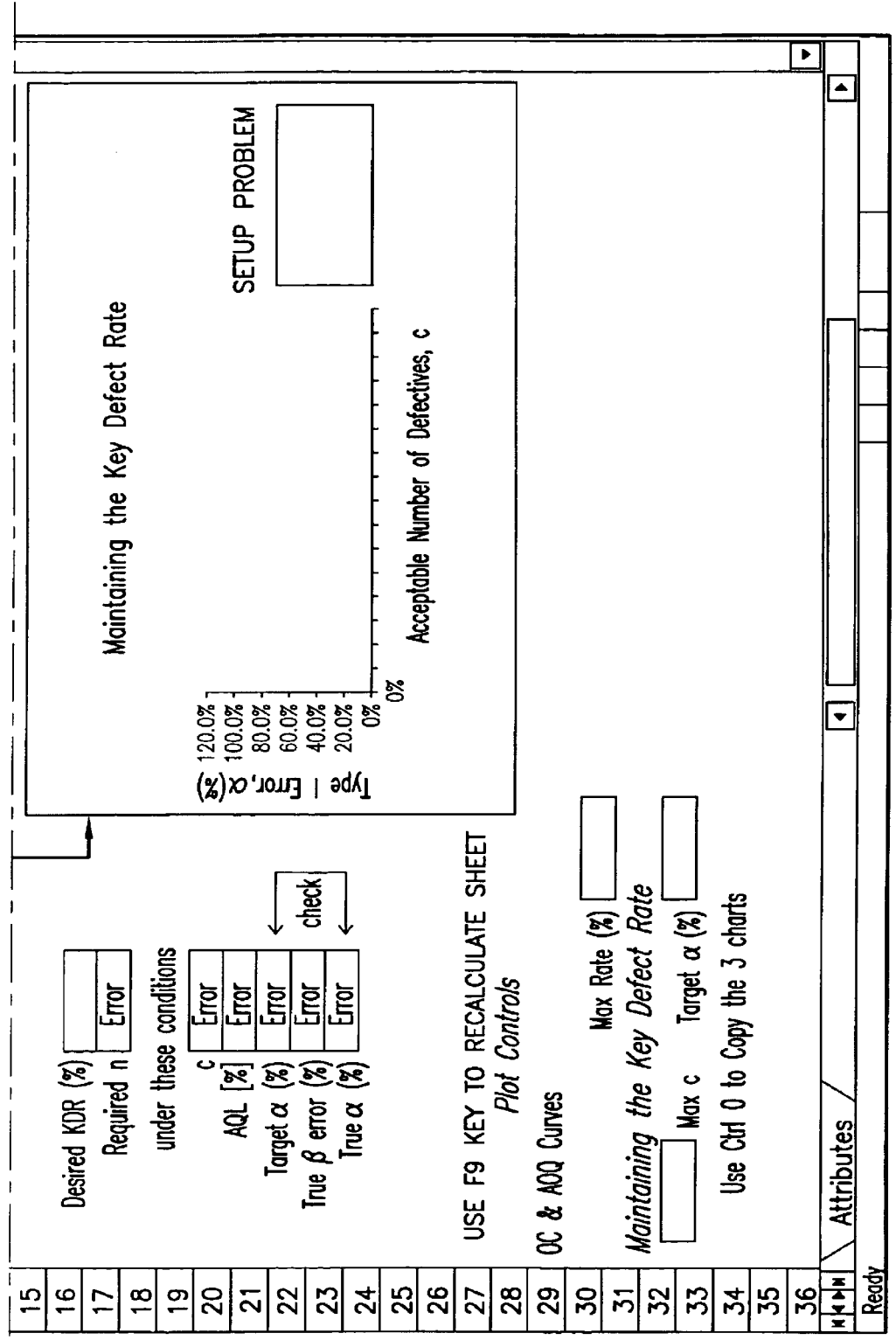
FIG. 10B is the bottom half of a screen shot of an attributes work sheet according to the present invention.

5. Detailed Description for Using the Microsoft Excel Workbooks 5.1 Attributes_SP.xls FIGS. 10A and 10B show the layout of the worksheet Attributes_SP.xls. The control panel is set up in columns B through F. Three (3) charts appear in columns G through P:

OC Curve. (Upper Left) A plot of the probability of accepting a lot (vertical axis) against the process defect rate (horizontal axis).

AOQ Curve. (Upper Right) A plot of the outgoing defect rate (vertical axis) against the process defect rate (horizontal axis).

Maintaining the Key Defect Rate. (Bottom) A plot of the α error (vertical axis) against the critical value (horizontal axis). The data labels represent the sample size required to maintain fixed values for both the KDR and the power at KDR.

As seen in FIGS. 10A and 10B, only eight (8) cells can be changed. See Table 3:

TABLE 3

| Editable Cell | Purpose |
| --- | --- |
| D4 | User specified n |
| D5 | User specified c |
| D6 | AQL |
| D7 | β error (becomes target when maintaining the KDR) |
| D16 | User specified KDR |
| E29 | Maximum defect rate for OC and AOQ curves |
| E31 | Maximum critical value for Maintaining the KDR graph |
| E32 | Nominal α error, required when maintaining the KDR |

A user has two options available for the construction of a particular sampling plan:

1. Specify the sample size, critical cutoff value, AQL, and β error, then evaluate this sampling plan by viewing the resulting α error and KDR. The "OC curve" and "AOQ curve" can then be used to get a more general perspective of the sampling plan and determine if it is practically feasible and still functional.

2. Specify the KDR, β, error, AQL, α error (target value), and critical value, then determine the required sample size. It is recommended that initially the critical value be set to 0, with the "Maintaining the KDR" graph providing its own evaluation of the sample size and critical value pair that keeps the true α error as close to the targeted (or nominal) value as possible.

The procedure for each of these two cases is outlined in the following two sections. To alleviate intermittent calculations from becoming a nuisance, the workbook has the manual calculation option selected. Therefore, the F9 key is used to recalculate the worksheet whenever necessary.

5.1.1 Attributes Data Sampling Plan: Unspecified KDR Case

The first scenario considered is the evaluation of a user-specified sampling plan. The sample size is entered in cell D4, with the critical value in cell D5, the AQL in cell D6, and the β error in cell D7. The resulting α error is displayed in cell D9, with the computed KDR found in cell D10.

EXAMPLE 1

Suppose that a user wants to evaluate a sampling plan involving a sample size of n=50 items with a c=0 acceptance criterion. The AQL is to be 0.65% and the test should provide 90% power.

Results: Example 1

Figure 11A:
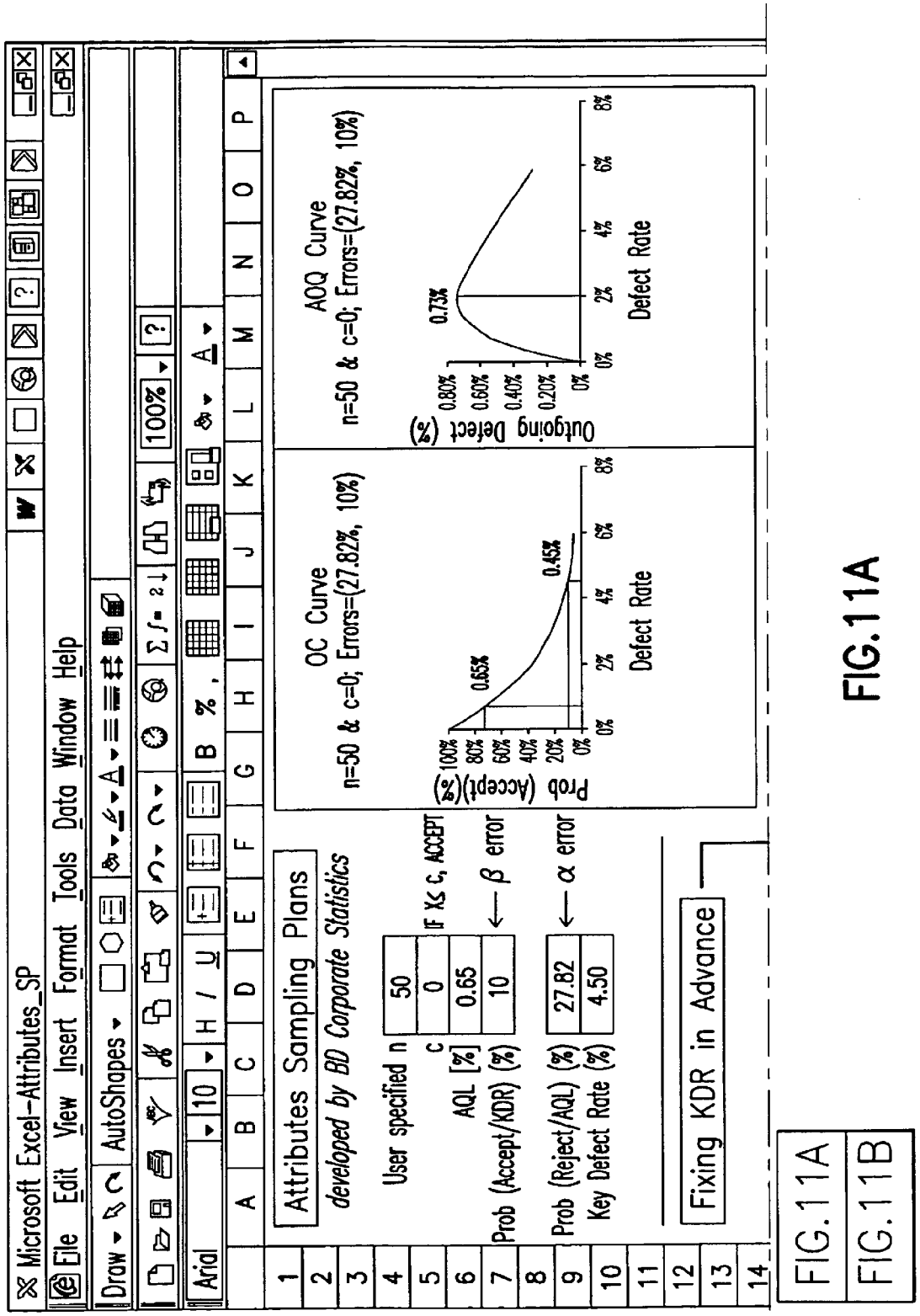
FIG. 11A is the top half of a screen shot of the work sheet of FIGS. 10A and 10B, for Example 1.
Figure 11B:
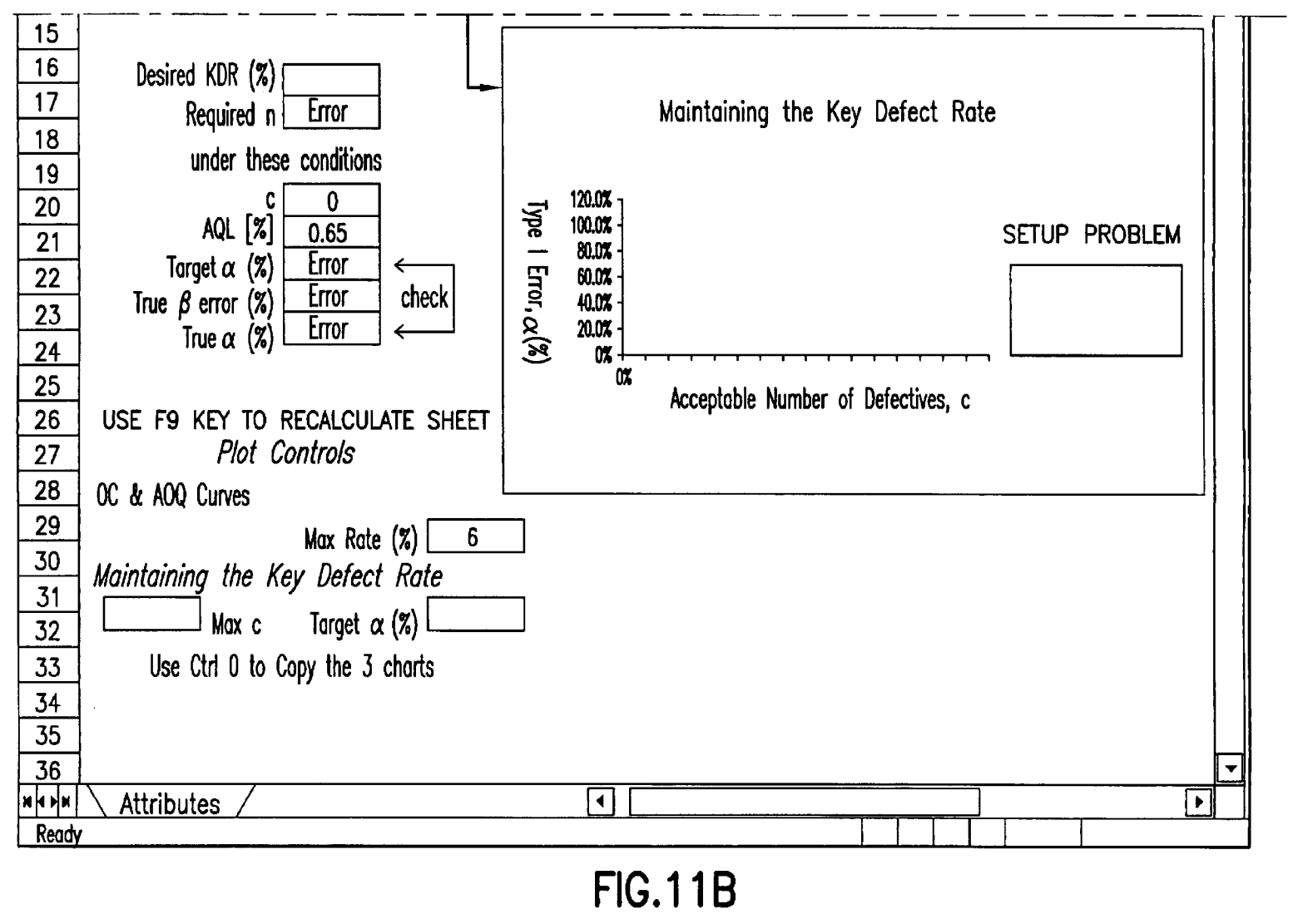

Entering the four given values into cells D4:D7 as outlined above, it is seen that the α error is 27.82%, with the KDR being 4.50%. A maximum defect rate of 6% (slightly above KDR) is entered in cell E29 in order to provide a decent horizontal axis scale. The spreadsheet is recalculated using the F9 key. FIGS. 11A and 11B illustrates this spreadsheet, which now shows an AOQL of 0.73%. The Maintaining the KDR graph indicates a setup problem due to the empty D16, B31, and E31 cells. However, this scenario does not attempt to control the KDR, so this error message should be ignored.

5.1.2 Attributes Data Sampling Plan: Specified KDR Case

The second scenario considered is to solve for the sampling plan parameters (n, c) in order to maintain a specific KDR at a given power under the conditions of a prescribed AQL and associated α error. The AQL is entered in cell D6, with the β error in cell D7 and the KDR in cell D16. In addition, the targeted α error is entered in cell E31, with a maximum critical value in cell B31 and an initial critical value in cell D5.

EXAMPLE 2

Suppose that it is desired to maintain a KDR of 3% with 95% probability. The false alarm rate is to be α=10% when the process is at AQL=1%. It is desired to compute the sampling plan parameters: namely the sample size, n, and critical cutoff, c.

Results: Example 2

Figure 12A:
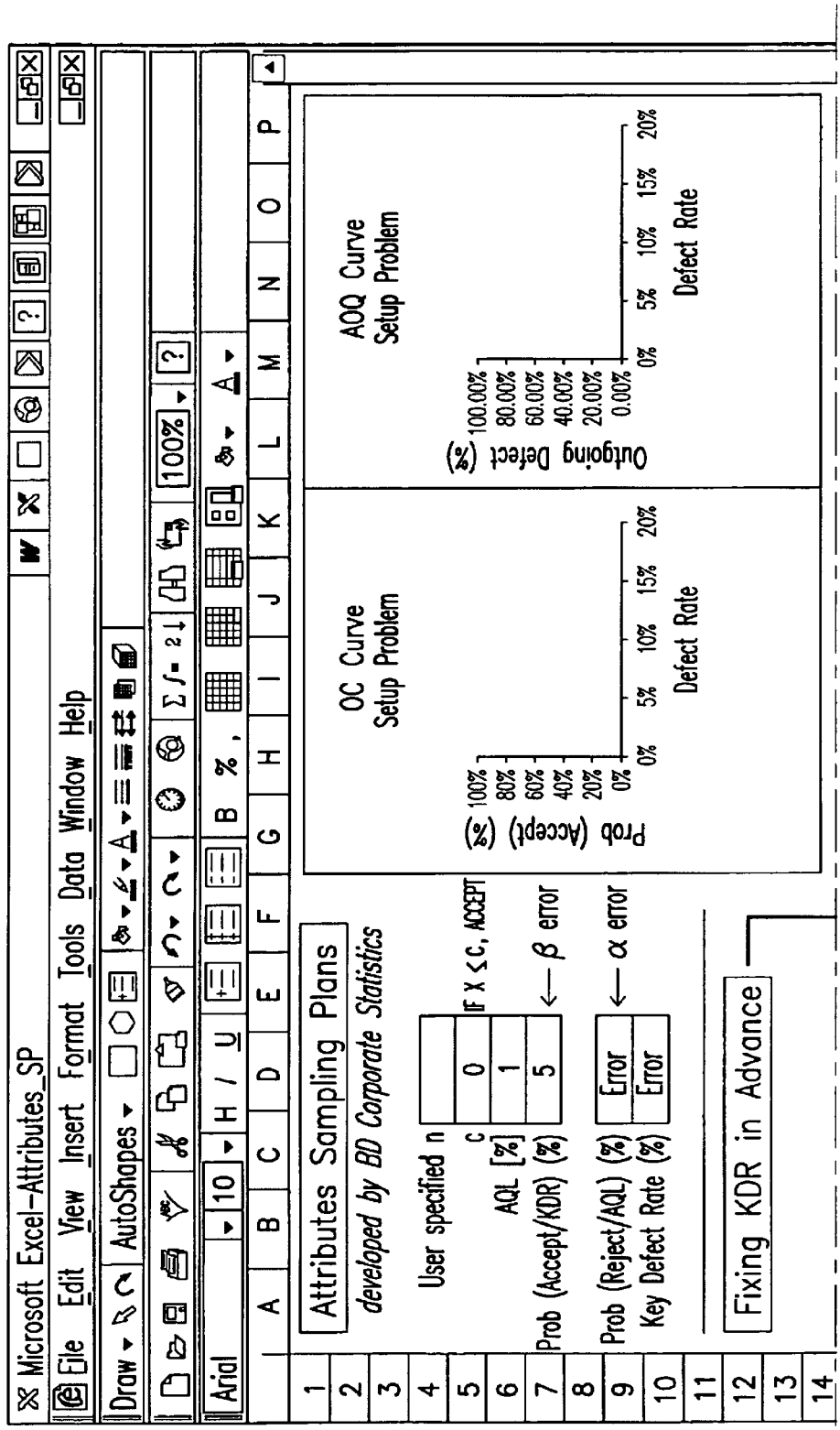
FIG. 12A is the top half of a screen shot of an attributes data initial spreadsheet, for Example 2.
Figure 12B:
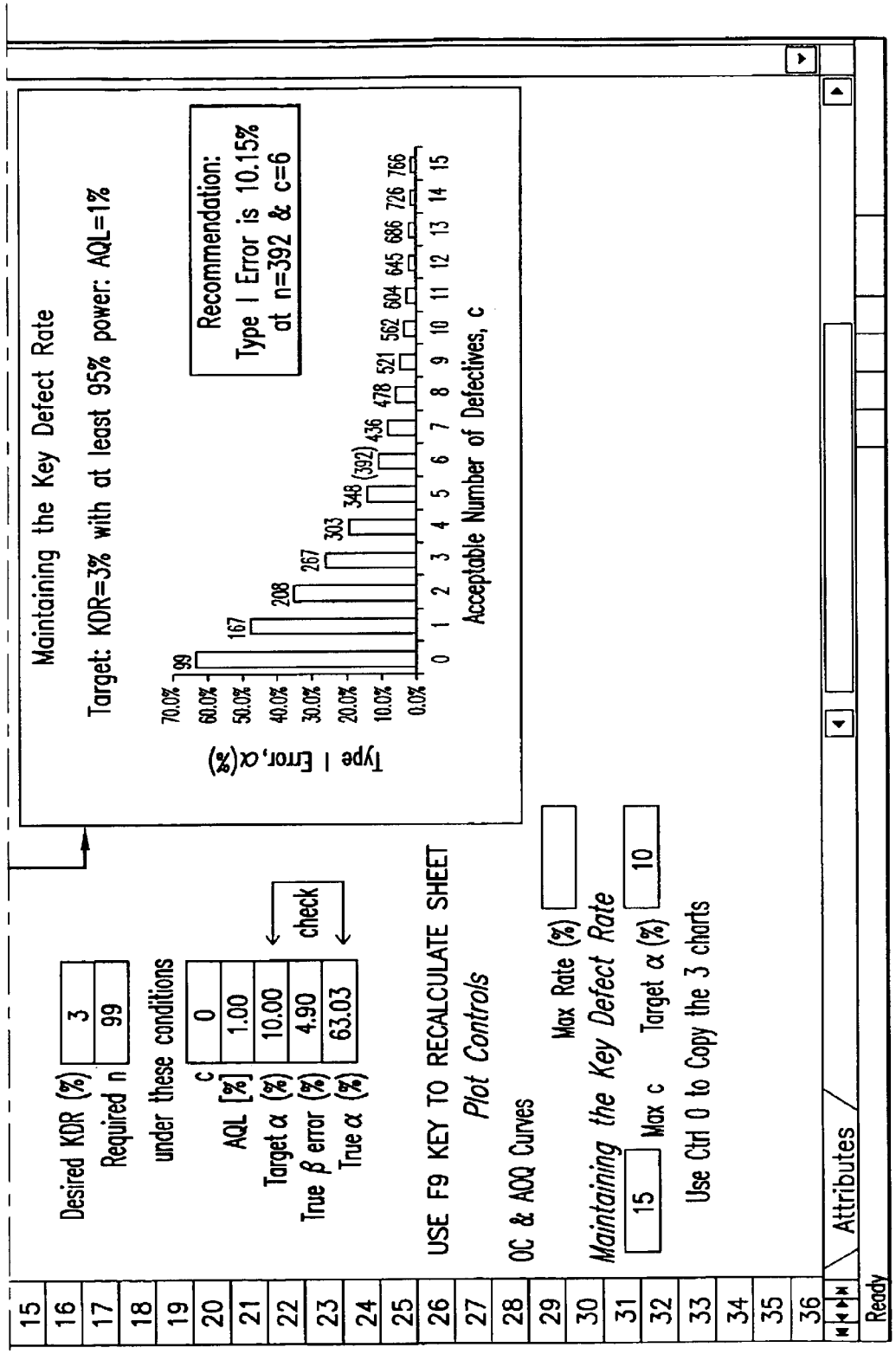
FIG. 12B is the bottom half of a screen shot of an attributes data initial spreadsheet, for Example 2.

Ignore cell D4, the sample size entry. Arbitrarily set c=0, thus entering "0" in cell D5. Then, enter "1" (AQL=1%) in cell D6, followed by entering "5" (β=5%) in cell D7. Next, enter "3" (KDR=3%) in cell D16. The targeted α error is entered as "10" in cell E31, with a maximum critical value of "15" in cell B31. Recalculate the spreadsheet using the F9 key. From this, it is seen in FIGS. 12A and 12B (viewing cell D17) that n=99 is needed. However, under these conditions, the false alarm rate is highly unacceptable (see cell D23), as α=63%. Lowering n would lower α but increase the KDR. Increasing n will increase α. Therefore, c should be increased.

To avoid forcing the user into performing an iterative search, the Maintaining the KDR chart is consulted. It is seen that the recommended sampling plan has parameters n=392 and c=6.

Figures 13A, 13B:
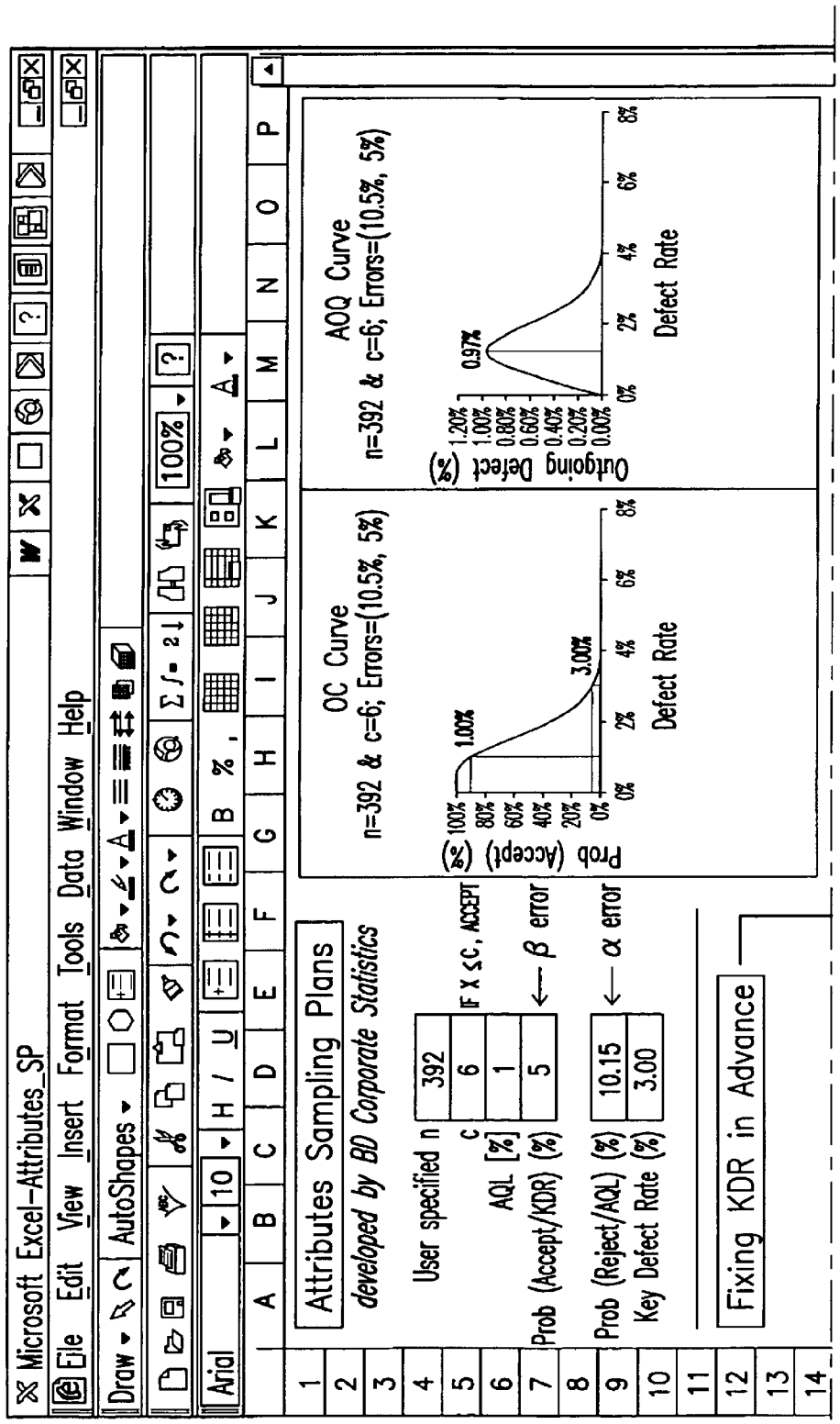
FIG. 13A is the top half of a screen shot of an attributes data final spreadsheet, for Example 2.
FIG. 13B is the bottom half of a screen shot of an attributes data final spreadsheet, for Example 2.

It will be understood that in FIGS. 12A and 12B, the OC curve and AOQ curve indicate setup problems, which are also signaled with warning lights for cells D4 and E29. Entering a "392" into cell D4 and a "6" into cell E29, along with a maximum defect rate (here use 6%, so enter a "6") in cell E29, finalizes the procedure. Lowering the maximum critical value to "7" in cell B31 would reduce the computation time needed for the recalculation (the F9 key), although this is not required. FIGS. 13A and 13B displays the final spreadsheet layout for this example. Here it is seen that the AOQL is 0.97%.

While a sample size of 392 may appear large, examine the constraints of the problem. The difference between AQL and KDR is only 2%, and higher precision generally means higher sample size. In addition, with both AQL and KDR being small numerically, the scenario is also affected by the rare events identification problem. This situation also may require larger sample sizes.

5.2 Variables_SP.xls

Figure 14A:
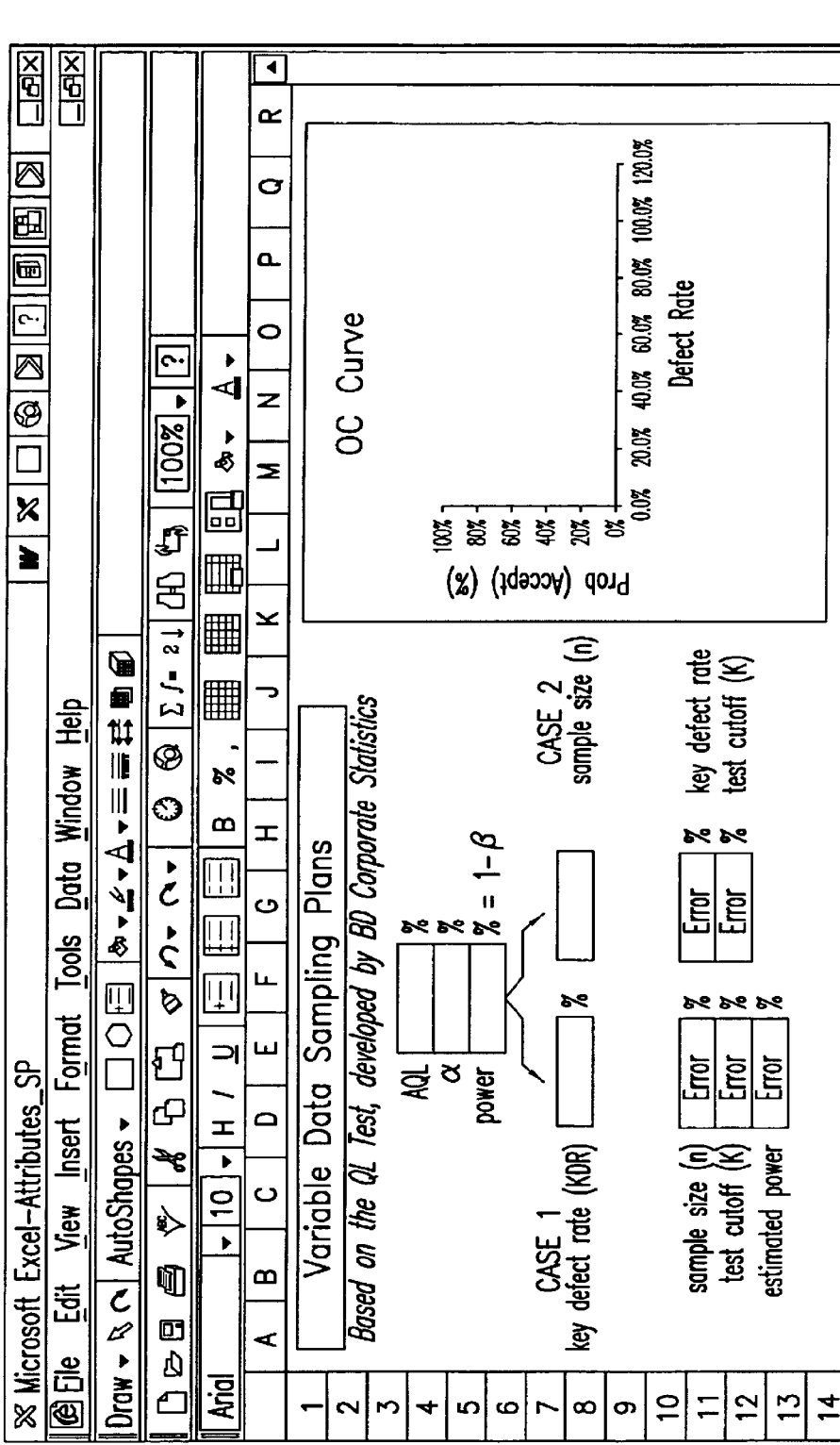
FIG. 14A is the top half of a screen shot of a variables spreadsheet according to the present invention.
Figure 14B:
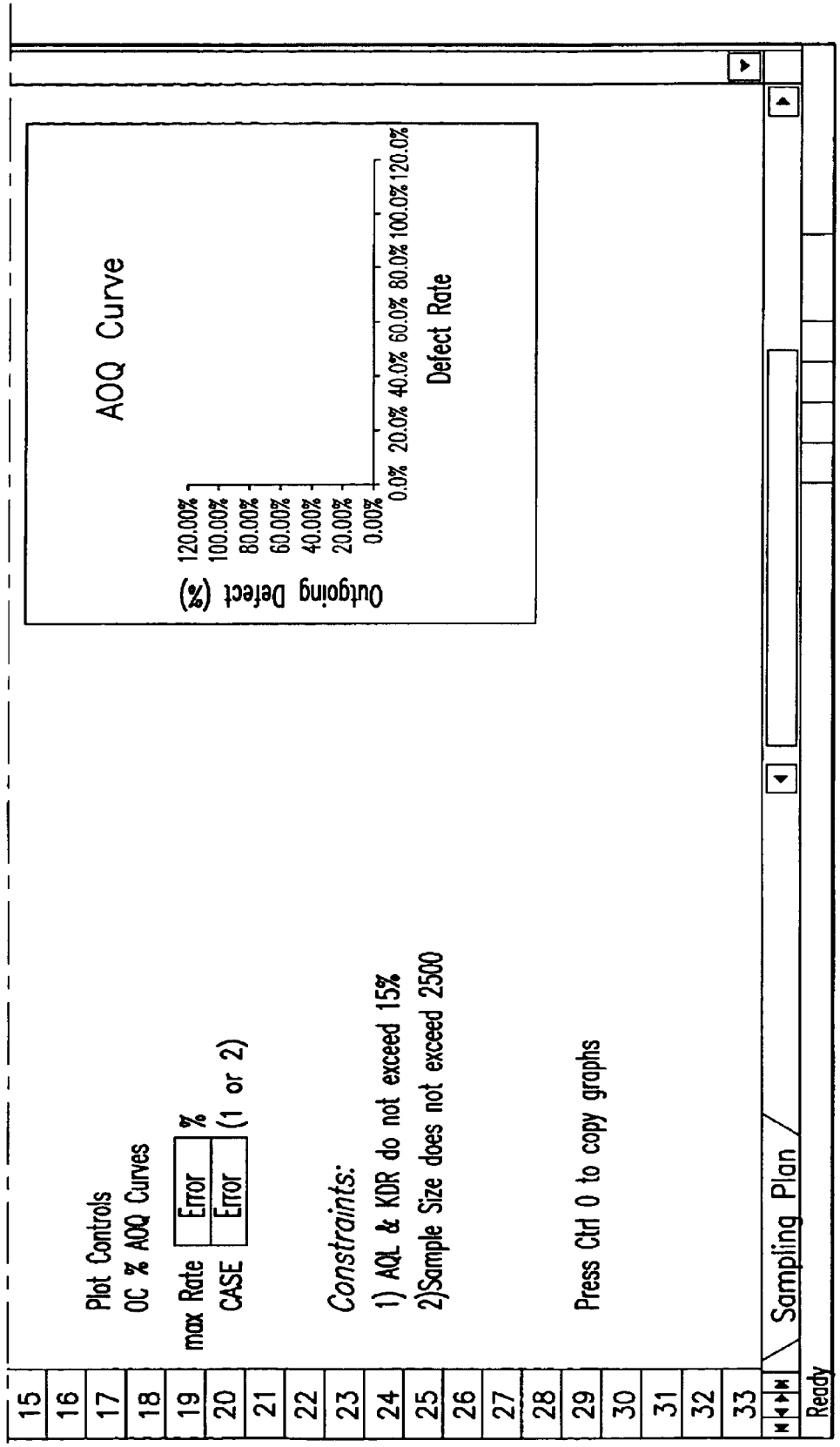
FIG. 14B is the bottom half of a screen shot of a variables spreadsheet according to the present invention.

FIGS. 14A and 14B shows the layout of the variables data sampling plan worksheet Variables_SP.xls. The control panel is set up in columns B through J. Two (2) charts appear in columns L through Q:

OC Curve. (Upper Left) A plot of the probability of accepting a lot (vertical axis) against the process defect rate (horizontal axis).

AOQ Curve. (Upper Right) A plot of the outgoing defect rate (vertical axis) against the process defect rate (horizontal axis).

As seen in FIGS. 14A and 14B, only seven (7) cells can be changed. See Table 4.

TABLE 4

| Editable Cell | Purpose |
| --- | --- |
| F4 | AQL |
| F5 | α error |
| F6 | power |
| E9 | User specified n |
| G9 | User specified KDR |
| C18 | Maximum defect rate for OC and AOQ curves |
| C19 | Case to plot (1 or 2)<br>1 = prescribe n<br>2 = prescribe KDR |

A user has two options available when constructing a particular variables data sampling plan:

1. Specify the KDR, β error, AQL, and α error, then determine the required sample size. The critical value is determined as a function of AQL and α.
2. Specify the sample size, AQL, and α error, and power, then evaluate this sampling plan by viewing the resulting KDR. Again, the critical value is determined as a function of AQL and α.

The OC curve and AOQ curve can be used to critique the resulting sampling plan for practical feasibility and functionality. The procedure for each of these two cases is outlined in the following two sections. Unlike Attributes_SP.xls, the workbook Variables_SP.xls does not have the manual calculation option selected, so the F9 key is not needed here.

5.2.1 Variables Data Sampling Plan: Unspecified KDR Case

Consider now the evaluation of a user-specified variables data sampling plan. The AQL is entered in cell F4, with the α error in cell F5 and the power in cell F6. The sample size is entered in cell G9. For plotting purposes, a maximum defect rate is entered in cell C18 and the case identifier "2" is entered in cell C19.

EXAMPLE 3

Suppose that the user wants to evaluate a sampling plan involving a sample size of n=50 items. The AQL is to be 0.65% with a false alarm rate of α=5%, and the test should provide 90% power.

Figure 15A:
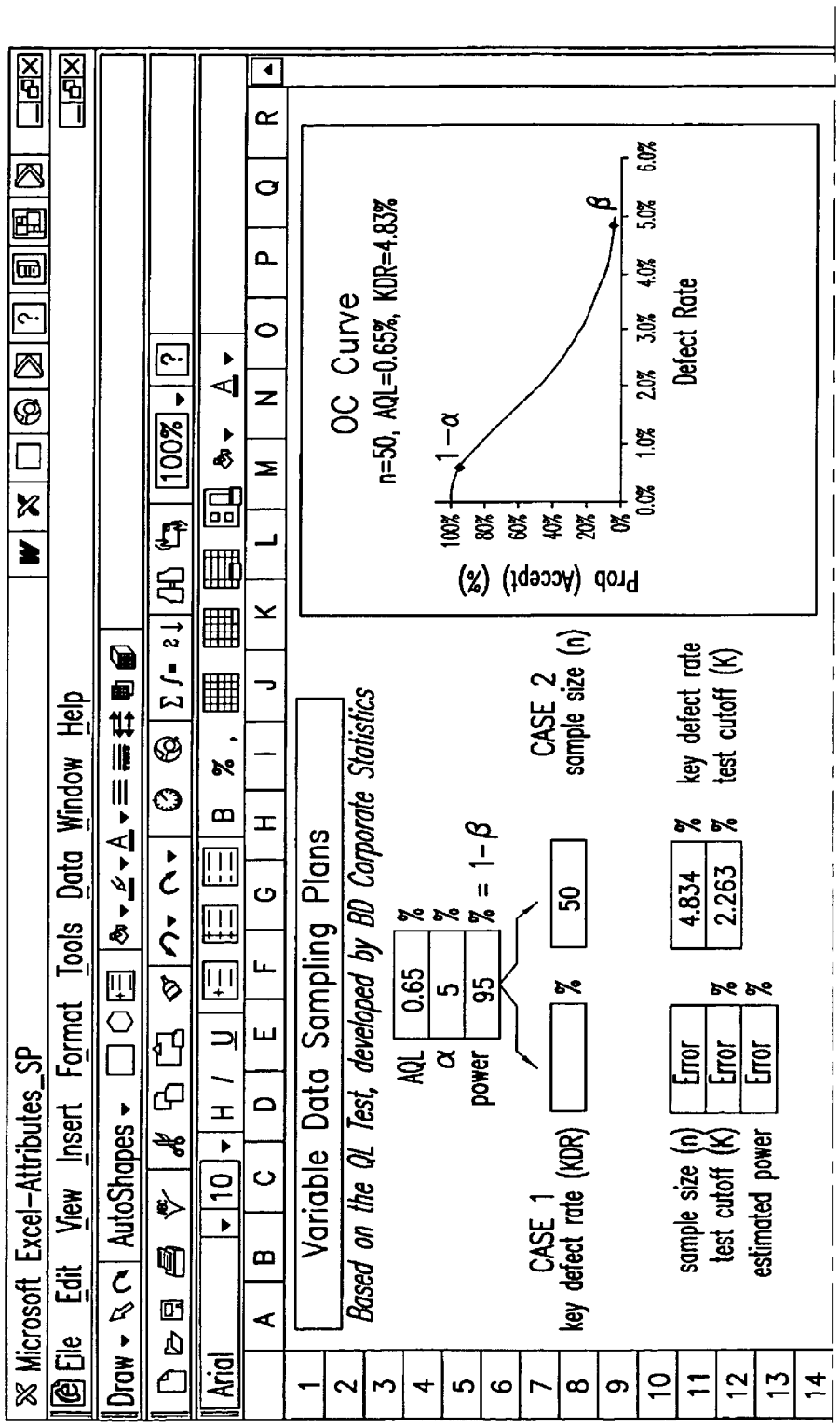
FIG. 15A is the top half of a screen shot of a variables data spreadsheet, for Example 3.
Figure 15B:
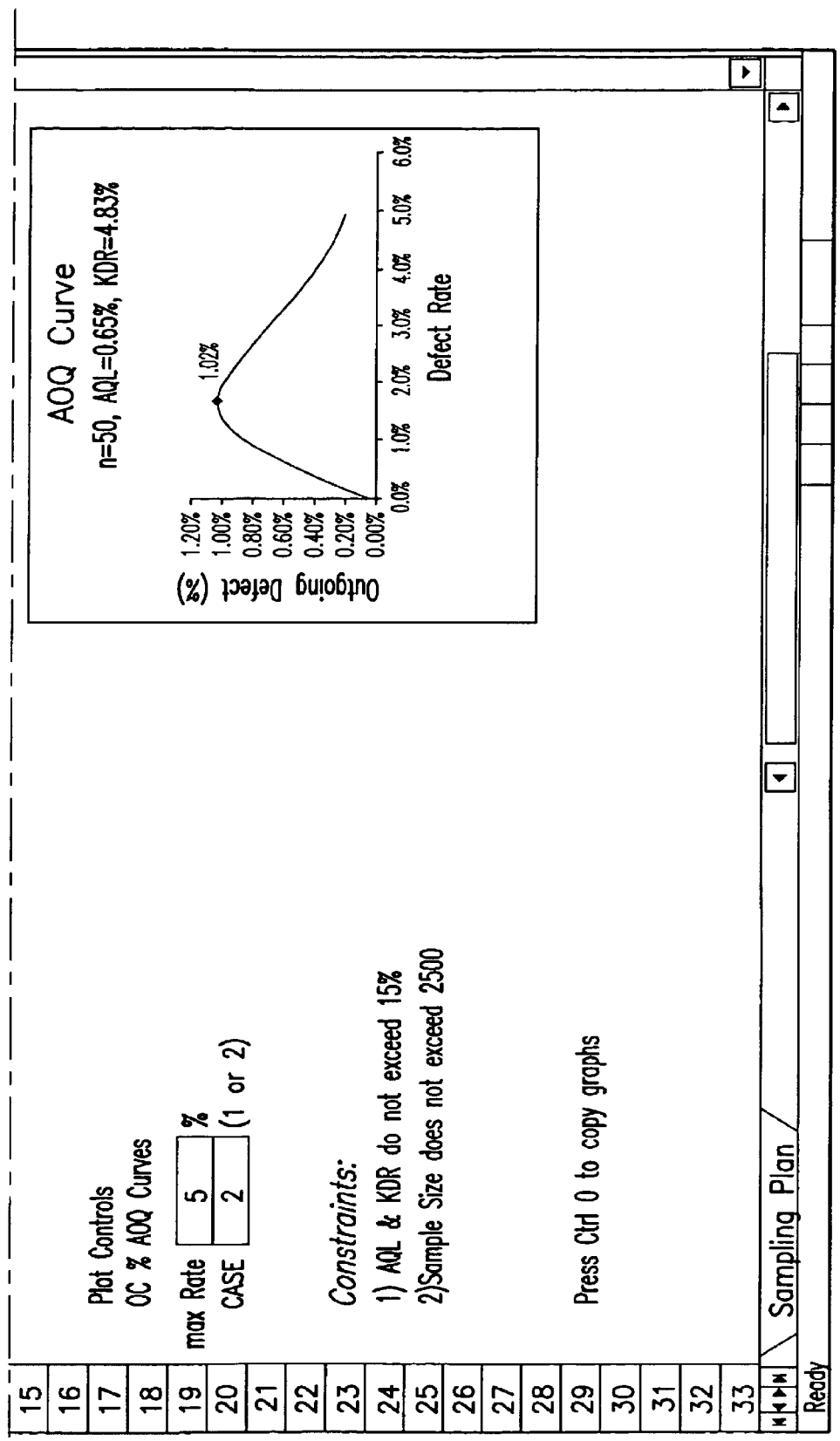
FIG. 15B is the bottom half of a screen shot of a variables data spreadsheet, for Example 3.

After entering a "0.65" in cell F4, a "5" in cell F5, a "90" in cell F6, and a "50" in cell G9, the resulting KDR of 4.025% is displayed in cell G11. Also, the critical value of 2.263% is displayed in cell G12. With the KDR being 4.025%, a maximum defect rate of 5% seems reasonable for the two plots. Thus, a "5" is entered in cell C18, with the case identifier "2" entered in cell C19. FIGS. 15A and 15B shows the final spreadsheet layout for example 3, where it is seen that the AOQL is 1.02%.

5.2.2 Variables Data Sampling Plan: Specified KDR Case

Next, consider the construction of a variables data sampling plan when the KDR is fixed in advance. Also given is the power at the KDR, the AQL, and the α error. The AQL is entered in cell F4, with the α error in cell F5 and the power in cell F6. The KDR is entered in cell E9. For plotting purposes, a maximum defect rate is entered in cell C18 and the case identifier "1" is entered in cell C19.

EXAMPLE 4

Suppose that it is desired to obtain 95% power at KDR 3%, with the false alarm rate being α=5% when the process is at AQL=1%. It is desired to compute the sampling plan parameters: namely the sample size, n, and critical value, K.

Results: Example 4

Figure 16A:
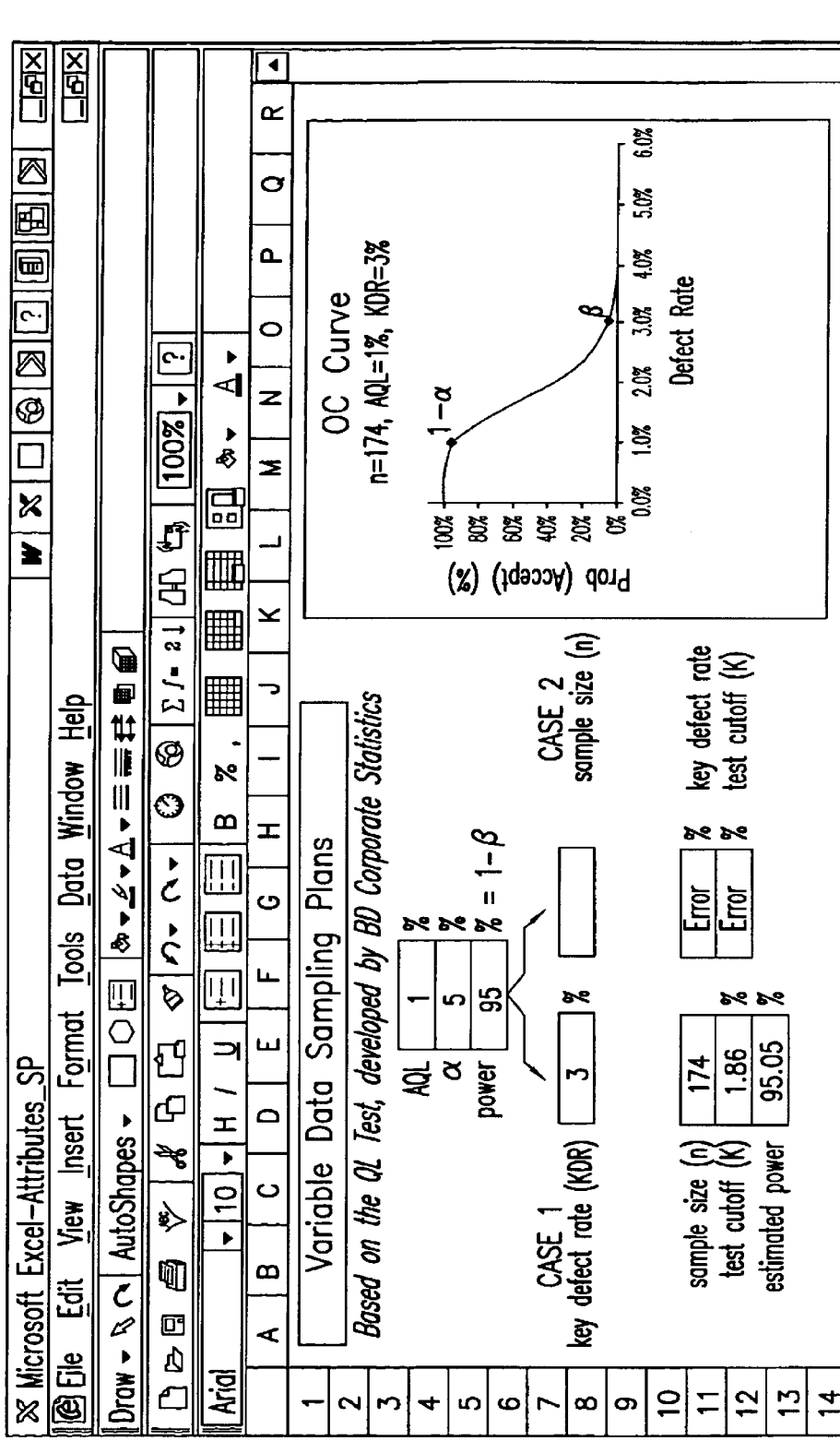
FIG. 16A is the top half of a screen shot of a variables data spreadsheet 14, for Example 4.
Figure 16B:
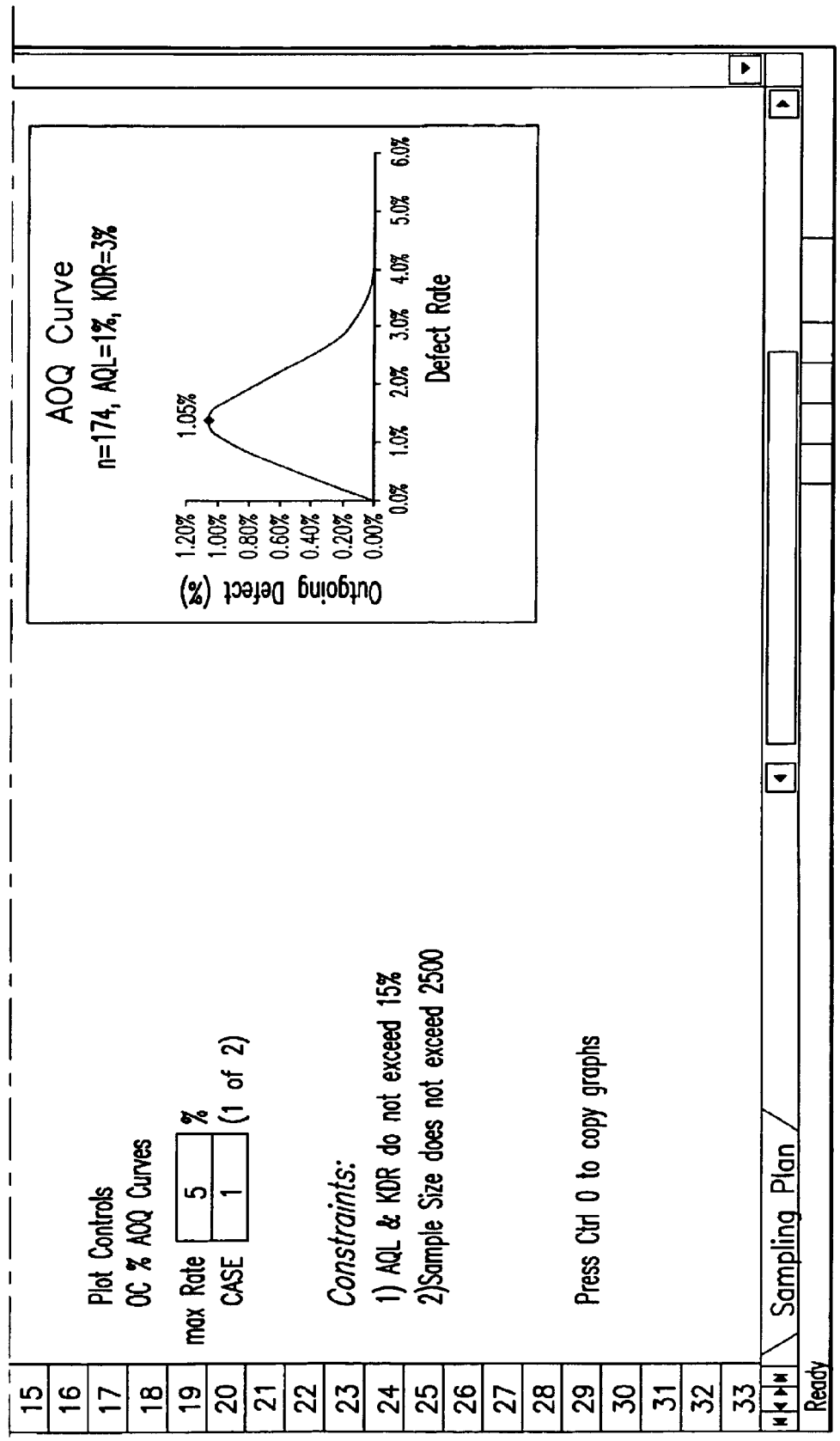
FIG. 16B is the bottom half of a screen shot of a variables data spreadsheet 14, for Example 4.

After entering a "1" in cell F4, a "5" in cell F5, a "95" in cell F6, and a "3" in cell E9, the resulting sample size of 174 is displayed in cell E11. Also, the critical value of 1.86% is displayed in cell E12. With the KDR being 3%, a maximum defect rate of 5% seems reasonable for the two plots. Thus, a "5" is entered in cell C18, with the case identifier "1" entered in cell C19. FIGS. 16A and 16B shows the final spreadsheet layout for example 4, where the AOQL is 1.05%.

It is the ease at which Example 4 is performed that illustrates the gains in flexibility that the QL test procedure has over the ANSI standard approach. The next section deals with the analysis of variables data when using the QL test procedure.

5.3 Variables_DA.xls

Figure 17A:
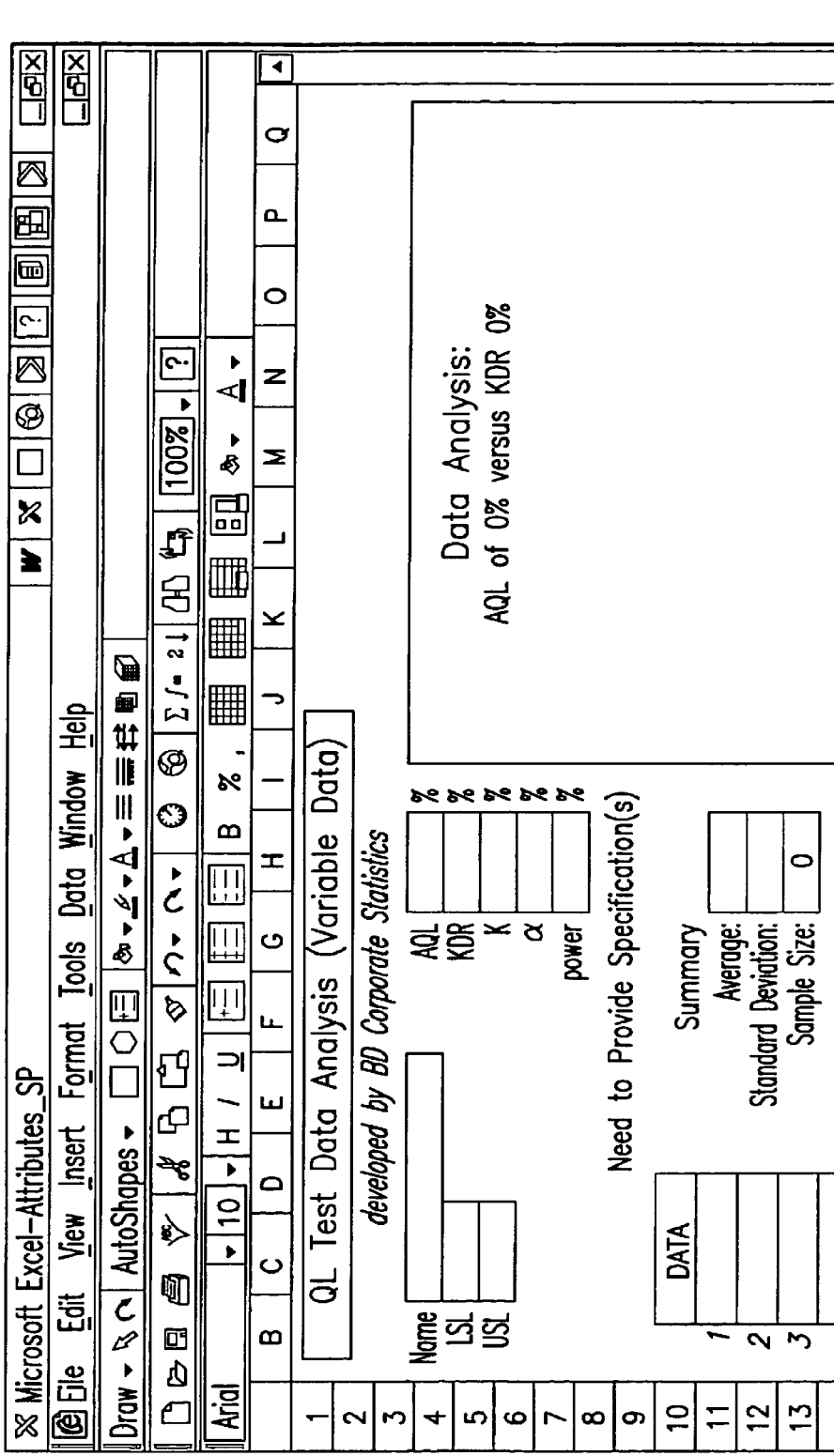
FIG. 17A is the top half of a screen shot of a variables data analysis spreadsheet according to the present invention.
Figure 17B:
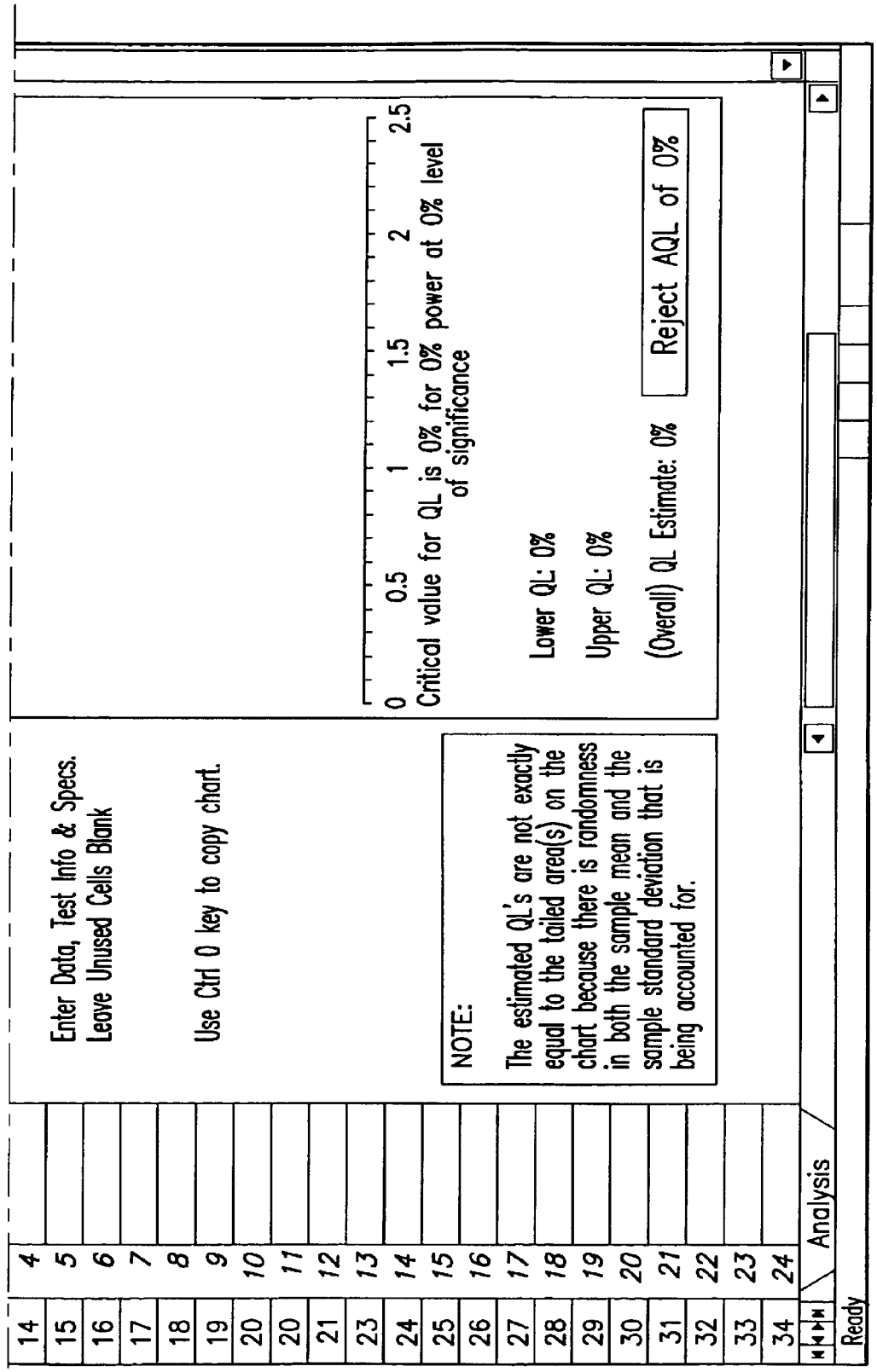
FIG. 17B is the bottom half of a screen shot of a variables data analysis spreadsheet according to the present invention.

The general spreadsheet layout of the variables data analysis workbook Variables_DA.xls is shown in FIGS. 17A and 17B. The data analysis summary is self-contained within one graph. Annotation is provided to report the particulars of the hypothesis test, the point estimate for the quality level, and an explicit conclusion.

As seen in FIGS. 17A and 17B, there are eight (8) editable cells devoted to the setup of the problem, and one long editable data field. See Table 5.

TABLE 5

| Editable Cell | Purpose | Editable Cell | Purpose |
|---|---|---|---|
| C4 | Response name | G4 | AQL |
| C5 | Lower specification limit | G5 | KDR |
| C6 | Upper specification limit | G6 | K, the critical value |
| C11:C2510 | Raw data entry | G7 | α |
| | | G8 | power |

While the workbook can handle response variables with either a one-sided or two-sided specification range, only the left-sided specification range is illustrated here.

EXAMPLE 5

Suppose that the response variable is separation force (ft.lbs.), and the lower specification limit is set at 8 ft.lbs. Assume that the conditions of Example 4 apply here: 95% power at KDR=3%, α=5% at AQL=1%. The sample size is n=174 and the critical value is K=1.86%.

Results: Example 5

Figure 18A:
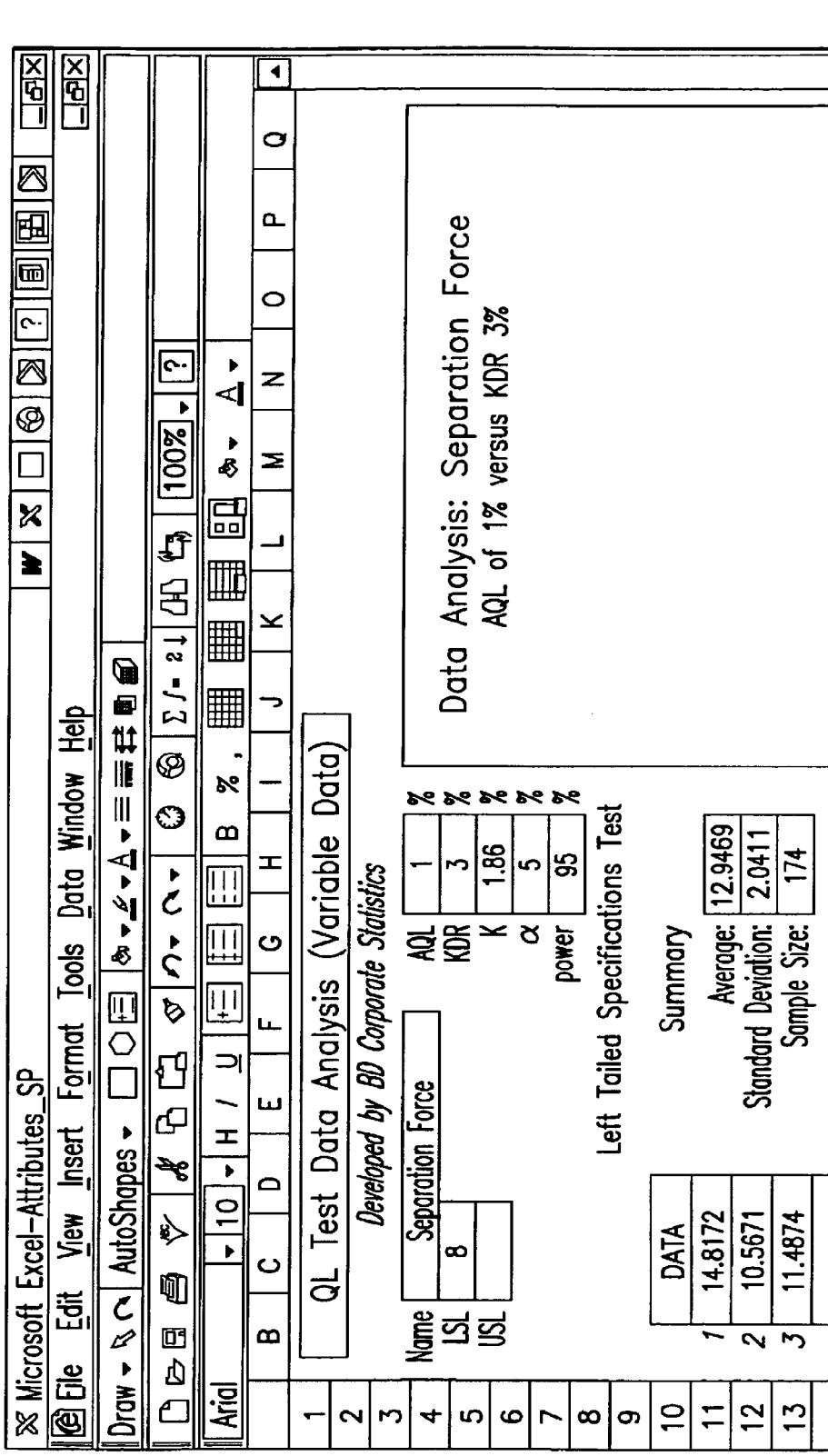
FIG. 18A is the top half of a screen shot of a variables data analysis spreadsheet, for Example 5.
Figure 18B:
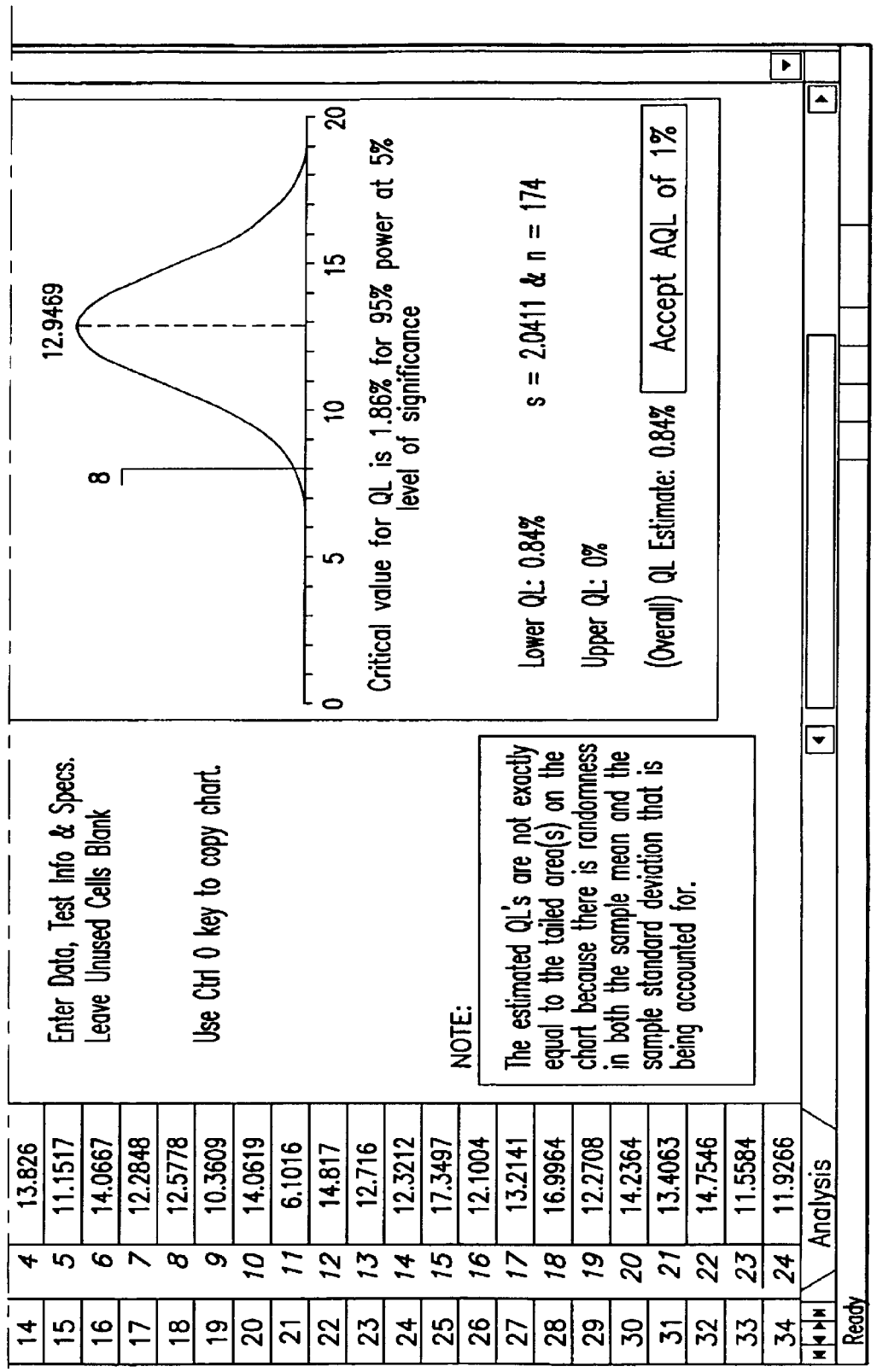
FIG. 18B is the bottom half of a screen shot of a variables data analysis spreadsheet, for Example 5.

To begin the analysis, enter the response name "Separation Force" into cell C4, and the lower specification limit equaling "8" in cell C5. The upper specification limit cell C6 is left blank. Then, the hypothesis test information is entered: a "1" in cell G4, a "3" in cell G5, a "1.86" in cell G6, a "5" in cell G7, and a "95" in cell G8. Finally, the data is placed in cells C11:C184. It is seen in FIGS. 18A and 18B that the QL estimate is 0.84% and that the conclusion is to accept the null hypothesis that the process defect rate is at AQL.

The normal curve displayed on the chart uses the sample mean and sample standard deviation as its parameters, with the mean being overlaid onto the curve. The specification limit(s) is(are) highlighted as well. However, it is again stressed that the QL estimate is not just the area under the curve beyond the specification limit(s): this area would not account for the random variability of either sample statistics used to generate the normal curve. This curve does, however, offer a simple graphical guide for ancillary purposes.

6. Conclusion

As shown, the QL test procedure for acceptance sampling can improve the ANSI standard procedure by allowing a tremendous gain in flexibility regarding the specification of the sampling plan parameters. By eliminating the need to use the vast quantity of ANSI tables and graphs and replacing them instead with an Excel workbook, improved construction of sampling plans can be provided. A less intimidating, less confusing, and more convenient tool to aid the non-statistically oriented user in constructing and analyzing acceptance sampling plans for variables data can be provided by the QL test.

In terms of computational issues, the results presently are mixed. It is true that the non-central t distribution and its complexity in obtaining tailed areas and critical values has been avoided. However, a large percentile grid may need to be stored, and the linear interpolation procedures can be rather involved. The QL test procedure does have the potential of becoming very computationally efficient. In particular, a unified model for the sampling distribution of p̂ may be developed. Such a model could eliminate the need of any interpolation algorithms and could make the sampling plan construction computations closed-formed.

It also has been shown that the three (3) Microsoft Excel workbook files can facilitate the construction of sampling plans for either attributes data or variables data. It also has been shown that the flexibility of the QL test procedure can be a vast improvement over sifting through a book of standards to obtain a sampling plan that may or may not be adequate. Computer resources have made obsolete the "one-size-fits-all" philosophy. With the growing trend toward statistical training in industry, the notion of using tables and charts for the sole purpose of keeping things parsimonious, at the expense of accuracy or correctness, is also outdated. Finally, it is recommended that since sampling plans can be constructed with the KDR specified in advance, it may be in the best interest of the user to determine and incorporate a value for the KDR via practical considerations. This action can protect the process from undetected drifts into an unacceptably high defect rate region.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A computerized method of constructing a sampling plan for items that are manufactured, comprising the steps of:

inputting into a computer, a desired sample size, a desired false alarm rate, a desired Acceptable Quality Limit (AQL) and a desired power of the sampling plan for the items that are manufactured; and calculating in the computer, a Key Defect Rate (KDR) that is produced from the desired sample size, the desired false alarm rate, the desired AQL and the desired power of the sampling plan for the items that are manufactured.

2. A method according to claim 1 wherein the calculating step comprises the step of:

computing a decision rule critical value based on the desired AQL and the desired false alarm rate for the desired sample size.

3. A method according to claim 2 wherein the calculating step comprises the steps of:

computing a decision rule critical value from the AQL, the false alarm rate and the desired sample size, using a bias corrected percentile grid of sample size and a true process defect rate; and evaluating the bias corrected percentile grid for values that are larger than the AQL, with the percentile being the desired power.

4. A method according to claim 1 wherein the calculating step is followed by the step of graphically displaying a relationship between acceptable number of defective items and false alarm rate, based upon the desired AQL, the desired KDR and the desired power of the sampling plan for the items that are manufactured.

5. A method according to claim 1 wherein the calculating step is followed by the steps of:

sampling the items that are manufactured at the desired sample size to obtain samples; and determining the KDR of the items that are manufactured from the samples.

6. A method according to claim 1 wherein the calculating step is followed by the steps of:

sampling the items that are manufactured at the desired sample size to obtain samples; and measuring a response variable for the each of the samples.

7. A method according to claim 6 wherein the measuring step is followed by the steps of:

inputting into the computer the measured response variable for each of the samples; and calculating in the computer, an estimate of the KDR for the items that are manufactured, based on the measured response variable for each of the samples.

8. A method according to claim 6 wherein the measuring step is followed by the steps of:

inputting into the computer the measured response variable for each of the samples; and calculating in the computer, a point estimate of a process defect rate for the items that are manufactured, based on the measured response variable for each of the samples.

9. A method according to claim 1 wherein the calculating step is preceded by the steps of:

calculating a sampling distribution that is variance invariant based on a normal distribution;

formulating a percentile grid of sample size and a true process defect rate, based on estimated percentiles of a cumulative distribution of the sampling distribution;

formulating a bias corrected percentile grid of sample size and the true process defect rate from the percentile grid; and storing the bias corrected percentile grid in the computer.

10. A computer system for constructing a sampling plan for items that are manufactured, the system comprising:

means for inputting a desired sample size, a desired false alarm rate, a desired Acceptable Quality Limit (AQL) and a desired power of the sampling plan for the items that are manufactured; and means for calculating a Key Defect Rate (KDR) that is produced from the desired sample size, the desired false alarm rate, the desired AQL and the desired power of the sampling plan for the items that are manufactured.

11. A system according to claim 10 wherein the means for calculating comprises:

means for computing a decision rule critical value based on the desired AQL and the desired false alarm rate for the desired sample size.

12. A system according to claim 11 wherein the means for calculating comprises:

means for computing a decision rule critical value from the AQL, the false alarm rate and the desired sample size, using a bias corrected percentile grid of sample size and a true process defect rate; and means for evaluating the bias corrected percentile grid for values that are larger than the AQL, with the percentile being the desired power.

13. A system according to claim 10 further comprising:

means for graphically displaying a relationship between acceptable number of defective items and false alarm rate, based upon the desired AQL, the desired KDR and the desired power of the sampling plan for the items that are manufactured.

14. A system according to claim 10 further comprising:

means for inputting a measured response variable for each of a plurality of samples of the items that are manufactured; and means for calculating an estimate of the KDR for the items that are manufactured, based on the measured response variable for each of the samples.

15. A system according to claim 10 further comprising:

means for calculating a sampling distribution that is variance invariant based on a normal distribution;

means for formulating a percentile grid of sample size and a true process defect rate, based on estimated percentiles of a cumulative distribution of the sampling distribution;

means for formulating a bias corrected percentile grid of sample size and the true process defect rate from the percentile grid; and means for storing the bias corrected percentile grid.

16. A system according to claim 10 further comprising:

means for inputting a measured response variable for each of a plurality of samples of the items that are manufactured; and means for calculating a point estimate of a process defect rate for the items that are manufactured, based on the measured response variable for each of the samples.

17. A computer program product for constructing a sampling plan for items that are manufactured, the computer program product comprising a computer-readable storage medium having computer-readable program code means embodied in the medium, the computer-readable program code means comprising:

computer-readable program code means for accepting a desired sample size, a desired false alarm rate, a desired Acceptable Quality Limit (AQL) and a desired power of the sampling plan for the items that are manufactured; and computer-readable program code means for calculating a Key Defect Rate (KDR) that is produced from the desired sample size, the desired false alarm rate, the desired AQL and the desired power of the sampling plan for the items that are manufactured.

18. A computer program product according to claim 17 wherein the computer-readable program code means for calculating comprises:

computer-readable program code means for computing a decision rule critical value based on the desired AQL and the desired false alarm rate for the desired sample size.

19. A computer program product according to claim 18 wherein the computer-readable program code means for calculating comprises:

computer-readable program code means for computing a decision rule critical value from the AQL, the false alarm rate and the desired sample size, using a bias corrected percentile grid of sample size and a true process defect rate; and computer-readable program code means for evaluating the bias corrected percentile grid for values that are larger than the AQL, with the percentile being the desired power.

20. A computer program product according to claim 17 further comprising:

computer-readable program code means for graphically displaying a relationship between acceptable number of defective items and false alarm rate, based upon the desired AQL, the desired KDR and the desired power of the sampling plan for the items that are manufactured.

21. A computer program product according to claim 17 further comprising:

computer-readable program code means for accepting a measured response variable for each of a plurality of samples of the items that are manufactured; and computer-readable program code means for calculating an estimate of the KDR for the items that are manufactured, based on the measured response variable for each of the samples.

22. A computer program product according to claim 17 further comprising:

computer-readable program code means for calculating a sampling distribution that is variance invariant based on a normal distribution;

computer-readable program code means for formulating a percentile grid of sample size and a true process defect rate, based on estimated percentiles of a cumulative distribution of the sampling distribution;

computer-readable program code means for formulating a bias corrected percentile grid of sample size and the true process defect rate from the percentile grid; and computer-readable program code means for storing the bias corrected percentile grid.

23. A computer program product according to claim 17 further comprising:

computer-readable program code means for inputting a measured response variable for each of a plurality of samples of the items that are manufactured; and computer-readable program code means for calculating a point estimate of a process defect rate for the items that are manufactured, based on the measured response variable for each of the samples.

* * * * *